(12) United States Patent
Fei et al.

(10) Patent No.: US 8,112,316 B2
(45) Date of Patent: Feb. 7, 2012

(54) DIGITAL PHOTOGRAPH PROCESSING AND ORDERING SYSTEM AND METHOD

(75) Inventors: Jason Fei, Buffalo Grove, IL (US); Timothy E. Stepp, Palatine, IL (US); Timothy Patrick McCauley, Libertyville, IL (US); Kurt Erchinger, Vernon Hills, IL (US); Rakesh Rajendran, Arlington Heights, IL (US); Clinton Rahn, Wauconda, IL (US)

(73) Assignee: Walgreen Co., Deefield, IL (US)

( * ) Notice: Subject to any disclaimer, the term of this patent is extended or adjusted under 35 U.S.C. 154(b) by 625 days.

(21) Appl. No.: 11/754,784

(22) Filed: May 29, 2007

(65) Prior Publication Data

US 2008/0300996 A1    Dec. 4, 2008

(51) Int. Cl.
    *G06Q 30/00*    (2006.01)
(52) U.S. Cl. ...................... 705/26.1; 705/27.1
(58) Field of Classification Search .................... 705/26, 705/27

See application file for complete search history.

(56) References Cited

U.S. PATENT DOCUMENTS

| | | | |
|---|---|---|---|
| 2003/0038882 A1* | 2/2003 | Chauvin et al. | 348/207.1 |
| 2003/0187687 A1* | 10/2003 | Miwa | 705/1 |
| 2005/0182649 A1* | 8/2005 | Parulski | 705/1 |
| 2006/0136236 A1* | 6/2006 | Horton | 705/1 |
| 2007/0005447 A1* | 1/2007 | Christ et al. | 705/27 |
| 2008/0228600 A1* | 9/2008 | Treyz et al. | 705/27 |

OTHER PUBLICATIONS

Target and Kodak Gallery Partnership Creates Complete Digital Photo Solution; New, Co-branded Online Service to Luanch May 30 (PR Newswire. New York: May 14, 2007).*

* cited by examiner

*Primary Examiner* — Jeffrey A Smith
*Assistant Examiner* — Courtney Stopp
(74) *Attorney, Agent, or Firm* — James P. Muraff; Neal, Gerber & Eisenberg LLP

(57) ABSTRACT

The disclosure presents a system and method for processing and managing customer orders for digital documents, such as digital photographs, through a network, such as the internet. The system may be implemented in a variety of ways, including a system, a method and/or a computer readable medium for processing and managing customer orders for digital documents, such as digital photographs, through a network, such as the internet.

19 Claims, 14 Drawing Sheets

FIG. 8

RETAIL WEBSITE—
PICTURES    Return to my album                Photo Pickup at Walgreens Select a Walgreens for pickup    Shopping Cart  Select Store  Payment  Review  Receipt Need help?

Choose to pick up prints at one of more than 5,000 Walgreens locations.

Enter your ZIP code or street address to search.

ZIP code [____] 902    Or    Street [_____] 906
                              City   [_____] 908
                              State  [▾] 910

Find stores within [5▾] miles
                    904

[Continue]

By using this site I agree to
Walgreens Terms and conditions

RETAIL WEBSITE— PICTURES  Return to my album

Shopping Cart  Select Store  Payment  Review  Receipt

Photo Pickup at Walgreens

Need help?

1300

Payment

Contact Information

First name:
Last name:
Phone: (    )
Email:

We will notify you when your order is ready.

For larger online orders, we require that you enter a credit card for payment.

Card type
Name on card
Number
Exp. date  Month ▷  Year ▷

Billing Address

Street
City
State — ▷  ZIP

Cancel  Continue

Walgreens Co. Terms and Conditions

FIG. 13

| | | | 1400 |
|---|---|---|---|
| RETAIL WEBSITE–PICTURES | Return to my album | | Photo Pickup at Walgreens |

Review — Shopping Cart  Select Store  Payment  Review  Receipt

Pickup Info  Walgreens:
2501 WAUKEGAN RD
BANNOCKBURN 60015 IL
Near Dunsbare lane and Half day rd
View store details and map         ←— 1402

Need help?

Estimated pickup time*: 1:35 PM Jan 5, 2006
We will e-mail you when your order is ready to be picked up.

Payment

Contact Information

Joe Phillips
(708) 123-1234
joephilips@wag.com

Edit contact info

Credit Card Info: MasterCard
Credit Card Number: xxxxxxxxxxxx0004
Exp. Date: 01/2006
Name: Joseph Phillips
Billing Address: 600 Pensylvania Ave
Deerfield IL 60015

Edit credit card info         ←— 1404

Prints Order

4 4x6 print(s)                              0.76
                        Subtotal:           0.76
            Less coupon savings:            0.00
Edit prints order       Sales tax**:        0.06         ←— 1406
                        Total:              0.82

*Based on system capacity
**Estimated tax: sees tore for details         Cancel  [Submit Order]         ←— 1408

Have Questions?

Contact Customer Service
(xxx) xxx-xxxx
aolpicturespickup@photo.walgreens.com

By using this site I agree to
Walgreens Terms and conditions

FIG. 14

DIGITAL PHOTOGRAPH PROCESSING AND ORDERING SYSTEM AND METHOD

TECHNICAL FIELD

This invention relates generally to a system and method for processing orders for digital documents. More particularly, the present invention relates to a system and method for processing and managing customer orders for digital documents, such as digital photographs, through a network, such as the internet.

BACKGROUND OF THE INVENTION

The increase in the number of digital cameras in use over the last few years has been significant. Hence, the increase in the number of digital photographs in need of printing is also significant. Many means for developing or printing such digital photographs exist. Camera users sometimes purchase printers and photographic paper for printing their own digital photographs. Many problems with the quality and the use of such technology are known, not to mention the time and effort required to print the digital images created by a digital camera user. Digital camera users also use memory sticks in such cameras to store the digital photographs, remove the memory sticks, and bring the memory sticks into a digital photograph developing store for either self or store processing using store equipment, such as a digital photograph image printer. For self-processing of the digital photos on the memory sticks, one must know or learn how to use the self-processing equipment. For store processing, a camera user may need to drop off the memory stick or wait for a store photo processing clerk to print out the photo images.

One alternative which has been in use is for a digital camera user to connect their digital camera to a personal computer (laptop or desktop) and "upload" the digital pictures to the hard drive of the computer. One or more digital processing websites exist which allows a digital camera user to then "upload" such digital photographs over the internet to the digital processing website. For each digital photograph, a user can enter their identification and contact information, select the size of each print, and enter payment method and payment details. The service provided by the website will then perform the digital photograph printing and mail the prints to the user with the their identification and contact information for the user. The user must then wait to receive their photographs in the mail, which can take days or longer.

Alternatively, in one prior system, a digital camera user can upload digital photographs over the internet to the digital photograph processing website. The digital photograph processing website then allows for the user to select a store in the area where the user is located (which may or may not be available to select), which will cause the digital photograph processing (print) order to be electronically sent to the selected store over a network connection, such as the internet. When the digital photograph processing (print) order is sent to the selected store, all of the digital photographs are sent as a part of the digital photograph processing (print) order. If a transmission error or problem occurs, the entire order including all of the digital photograph images must be re-sent, creating significant network traffic. In addition, if many orders are sent and received at any one store, significant computer memory must exist to store such orders until printing occurs. Once received, the selected store places the order in queue for printing in the order it was received, along with all of the other orders it receives in such manner, as well as orders placed directly at the store ("analog" orders). On the website, the user is told to pick up the order after a set amount of time has passed, which set amount of time does not necessarily represent the true real time availability of the digital photograph processing services (and time it will take) or the selected store. The processed order may in fact be available sooner, or from time to time may not be available even after the set amount of time indicated has passed.

Despite the advances in the field, the industry is in need of more efficient systems and methods for processing and managing customer orders for digital documents, such as digital photographs, through a network, such as the internet. Thus, the present invention is provided to solve these and other problems.

SUMMARY OF THE INVENTION

The present invention provides a system and method for processing and managing customer orders for digital documents, such as digital photographs, through a network, such as the internet. The system may be implemented in a variety of ways, including as a system, a method, and/or a computer readable medium for processing and managing customer orders for digital documents, such as digital photographs, through a network, such as the internet. In one embodiment, the system has logic for and the method receives at a first server an upload of a digital image from a first client computer. The system and method receives at the first server identification data associated with the digital image, and stores in a first memory associated with the first server the digital image. The system and method further stores in the first memory the identification data associated with the digital image, and receives at the first server a first digital image print request. The system and method also receives an electronic first remote location identification of a first remote location to have the digital image printed, and electronically sends to the first remote location a second digital image print request to have the digital image printed, without sending the digital image to be printed.

The system and method can further receive at the first server the first digital image print request comprises providing for receiving at the first server the digital image print request from a second client computer. Receiving at the first server an upload of a digital image and receiving at the first server the first digital image print request can be performed proximate in time to one another, and the digital image and the first digital image print request and can be received from the first client computer. In addition, the step of receiving at the first server the first digital image print request can include receiving at the first server the first digital image print request from a second server, with the second server having previously received the first digital image print request from at least one of the first client computer and/or a second client computer. The system and method can also receive from the first remote location a request to download the digital image, and send to the first remote location the digital image for printing the digital image at the first remote location. After receiving at the first server the first digital image print request, the system and method can format the first digital image print request for receipt by a remote printer interface computer, and can transmit the formatted digital image print request as the second digital image print request to have the digital image printed, without transmitting the digital image. The digital image can be a photographic digital image document, a graphic digital image document, a digital text document, a combined digital text and photographic digital image document, a combined digital text and graphic digital image document, or another form of digital image.

In another embodiment, the system can have a first client computer for sending a plurality of digital photographic images to be printed, and a retail server for receiving from the first client computer an upload of the plurality of digital photographic images to be printed and for storing the plurality of digital photographic images in a digital photographic image database associated with the retail server. The system also includes a central computer for receiving a print request from at least one of the retail server, the first client computer, and/or a second client computer, for printing the plurality of digital photographic images stored in the digital photographic image database, and a plurality of remote printer controllers located at a plurality of remote retail stores for printing the plurality of digital photographic images. Each remote printer controller has a remote location identification. The central computer can select which of the plurality of remote printer controllers to send the print request and/or can receive a selection of which of the plurality of remote printer controllers to send the print request. The central computer then sends the print request to the selected remote printer controller without sending the plurality of digital photographic images to be printed. The selected remote printer controller can send a request to receive the plurality of digital photographic images after the printer controller determines that an associated printer queue to the selected remote printer controller, has sufficient space or is empty and is ready to receive the digital images for printing.

In one embodiment, the retail server can be an internet service provider server, and one or more web pages are initiated from the central server and displayed through the retail server for receiving information necessary to generate the print request. The retail server can also or alternatively function as a digital photograph storage server. The retail server can initiate one or more web pages for receiving at least a portion of the information necessary to generate the print request.

In an additional embodiment, a method is provided for processing and managing customer orders for digital photographic images through a network. The method receives at a central server a first digital image print request from a second computer and receives a selection of a first remote location identification to have the digital image printed at a first remote location associated with the first remote location identification. The method further sends to the first remote location a second digital image print request to have the digital image printed, without sending the digital image to be printed to the first remote location. The method can also determine that the first remote printer and/or associated printer queue is ready to process the second digital image print request to have the digital image printed, and transmit a third request to a digital image repository storing the digital image for obtaining the actual digital image to be printed. The method can further receive the actual digital image to be printed from the digital image repository in response to the third request, and print the actual digital image received from the digital image repository. The digital image repository or memory can be associated with the second computer and/or the central computer. The second computer can be a retail website server for providing functionality for identifying and receiving information on products and services which can be obtained through the first location, such as drug store products when the first location is a drug store which provides digital image print processing. The second computer can be a second party retail website server, such as a website which facilitates storing and retrieving a plurality of digital photographic images. The second party retail website server can also be an internet service provider website, such as AOL. The method can also receive at the digital image repository an upload of the digital image from the client computer, store in a memory associated with the digital image repository the digital image, and receive at the digital repository a request from a first location computer to send the digital image to the first remote computer for printing the digital image on a first remote printer associated with the first remote computer.

In another embodiment, the method can receive at the second server an upload of the digital image from a first client computer, receive at the second server identification data associated with the digital image, store in a memory associated with the second server the digital image, store in the memory the identification data associated with the digital image, and receiving at the second computer a request to send the digital image to the first remote location computer. The method can allow the user to change the print location by receiving at the central server a change of location request for changing the location to have the digital image printed. Changing the location can include receiving a selection of a new remote location identification to have the digital image printed at a new remote location associated with the new remote location identification, sending to the first remote location a digital image print cancel request to cancel the second digital image print request to have the digital image printed, and sending to the new remote location a new digital image print request to have the digital image printed, without sending the digital image to be printed to the new remote location.

In a further embodiment, the method includes receiving at the first server an availability message from the plurality of the remote locations, wherein the availability message comprises store identifier and an earliest time the digital image print request can be completed for the associated store identifier. The availability message can be dependent upon at least one of a number of print requests presently pending and/or a content of each print request. The content of each print request can include a total size of images to be printed, type of output for each image, and the number of prints for each image type, and/or a store identifier.

Other systems, methods, features, and advantages of the present invention will be, or will become, apparent to one having ordinary skill in the art upon examination of the following drawings and detailed description. It is intended that all such additional systems, methods, features, and advantages included within this description, be within the scope of the present invention, and be protected by the accompanying claims.

BRIEF DESCRIPTION OF THE DRAWINGS

The present invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 8 is digital photograph development and purchasing interface screen of the embodiments of FIGS. 1, 2, and/or 3.

FIG. 9 is further digital photograph development and purchasing interface screen of the embodiments of FIGS. 1, 2, and/or 3.

FIG. 13 is further digital photograph development and purchasing interface screen of the embodiments of FIGS. 1, 2, and/or 3.

FIG. 14 is further digital photograph development and purchasing interface screen of the embodiments of FIGS. 1, 2, and/or 3.

DETAILED DESCRIPTION

Figure 1:
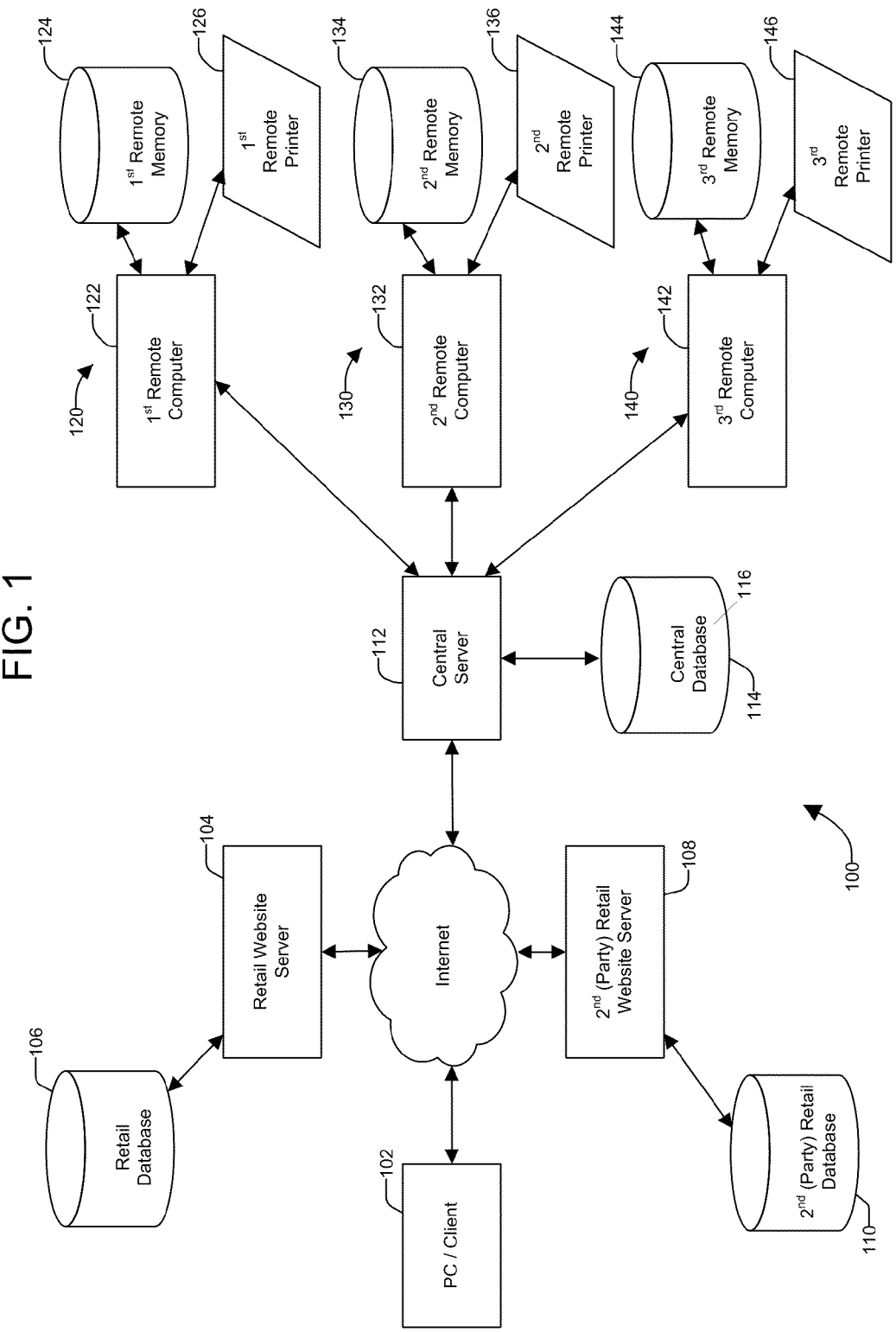
FIG. 1 is a graphical representation of a computer based digital photograph processing and order management system and method.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 is a graphical representation of a computer based digital photographic image print processing system 100. The system 100 includes a first computer 102 having a processor, a user interface display and associated software and hardware for connecting the first computer 102 to the internet or other communications network. The first computer can be a client computer 102 for running a internet browser and for providing access to websites over the internet. The system 100 also includes a retail computer 104, which can host, run and launch a retail application or retail website, and associated interface screens for a first retail application or website, such as an internet service provider website or other traditional retail website, including but not limited to America Online (AOL), Comcast, Google, Yahoo, Amazon, eBay, etc. The client computer 102 can obtain access to the first retail computer 104 and first retail website interface screens within the context of the present invention, over the internet or communications network. A first retail memory 106 and first retail database therein, is in communication with or is associated with the first retail computer 104. The first retail computer 104 can include therein the first retail memory 106.

The system 100 can also include a second retail computer 108 in communication with the first retail computer 104 and the client computer 102 via a communications network, such as the internet. The second retail computer 108 is provided for hosting an application or retail website which has digital photographic image printing functions through which a user can choose from various selections through which requests for digital photographic image printing can be performed. Some of the interface screens through which the digital photographic image printing functions and selections are provided are shown in FIGS. 8-14, as will be described in greater detail below. As understood from these FIGs. and the below description, the interface screens of FIGS. 8-14 can be run, hosted and/or launched from the second retail computer 108 through the first retail computer 104 for display and use of the digital photographic image printing functions and selections at the first computer 102. A second retail memory 110 and second retail database therein, is in communication with or is associated with the second retail computer 108. The second retail computer 108 can include therein the second retail memory 110. The second retail computer 108 can also be considered as a second "party" retail computer 108, in at least an embodiment where the second party retail computer 108 and/or central server 112 host at least a portion of a company's operations associated with the uploading and management of digital photographic images and print requests, for printing at remote locations 120, 130, 140 of the company. For example, WALGREEN CO., the assignee of the present application can maintain a website at which digital photographic images can be uploaded to, managed and requests to print such digital photographic images can be performed. In one embodiment, the website pages, scripts, XML calls, etc., through which the uploads can occur, the print requests can be placed, etc., as can be better understood with reference to FIGS. 8-14, are displayed and utilized through the client computer 102, but through the first retail computer 104, and originating from Walgreen's computer systems, as implemented within the second party retail website and/or central server 112, and associated memories 110, 114 and systems. In such an embodiment and other embodiments, the remote locations 120, 130, 140 can be company owned and/or controlled (WALGREEN CO.'s) stores at which the digital photographic image print requests can be processing and the digital photographic images can be printed for pick-up by the customer (typically the user of the first computer 102, or their friends or relatives across the country). In a further embodiment, the second party retail computer 108 and associated second party retail memory 110 and databases, can be a "non-company" retail website having at least one primary purpose of receiving uploads of digital photographic images, allowing users thereof to manage their digital photographic images, and allowing users thereof to place digital photographic print requests (traditionally for printing at a remote location and mail order to the customer—the user of the first computer 102), among other purposes. SNAPFISH is one example of such a second party retail website 108.

As mentioned, the system 100 shown in FIG. 1 can also have a central computer 112 through which at least the tracking and management of at least the availability of remote print processing locations, can be centralized for efficient digital photographic image print processing. The central computer 112 can be operably connected to, associated with, and in communication with a central memory 114 and central database 116 therein. The central computer 112 can include therein the central memory 114. The central memory 114 and associated central computer 112 store and execute a central storage and photographic processing software application for which can process and store photographic image print requests for printing of photographic images at remote locations 120, 130, 140 utilizing availability information about the remote locations 120, 130, 140, where printing of the photographic images will take place.

Specifically, the system 100 has first, second, and third remote locations 120, 130, and 140, respectively, for receiving print requests and for processing the print requests for printing on digital photographic image paper stock (does this include die sublimation printing solutions?) the digital photographic images. The first remote location 120 includes a first remote computer 122, a first remote memory 124 and a first remote digital photographic image printer 126. The first remote computer 122 receives and sends communications from and to the central computer 112 and/or the retail computers 104, 108, such as over the internet or other communication network, for processing print requests and for other functions as will be described further below. The first remote computer 122 is operably connected with and in communication with the first remote memory 124 and the first remote digital photographic image printer 126. The first remote computer 122 has a processor and digital photographic print processing application running therein for interfacing and communicating with the first remote memory 124 and the first remote digital photographic image printer 126, and for processing digital photographic image print requests and digital photographic images.

Likewise, the second remote location 130 includes a second remote computer 132, a second remote memory 134 and a second remote digital photographic image printer 136. The second remote computer 132 receives and sends communications from and to the central computer 112 and/or the retail computers 104, 108, such as over the internet or other communication network, for processing print requests and for other functions as will be described further below. The second remote computer 132 is operably connected with and in communication with the second remote memory 134 and the second remote digital photographic image printer 136. The second remote computer 132 has a processor and digital photographic print processing application running therein for interfacing and communicating with the second remote memory 134 and the second remote digital photographic image printer 136, and for processing digital photographic image print requests and digital photographic images.

Further, the third remote location 140 includes a third remote computer 142, a third remote memory 144 and a third remote digital photographic image printer 146. The third remote computer 142 receives and sends communications from and to the central computer 112 and/or the retail computers 104, 108, such as over the internet or other communication network, for processing print requests and for other functions as will be described further below. The third remote computer 142 is operably connected with and in communication with the third remote memory 144 and the third remote digital photographic image printer 146. The third remote computer 142 has a processor and digital photographic print processing application running therein for interfacing and communicating with the third remote memory 144 and the third remote digital photographic image printer 146, and for processing digital photographic image print requests and digital photographic images. Some or many additional remote locations can be connected and arranged in the same or similar manner, as described above, and as will be described further below.

Figure 2:
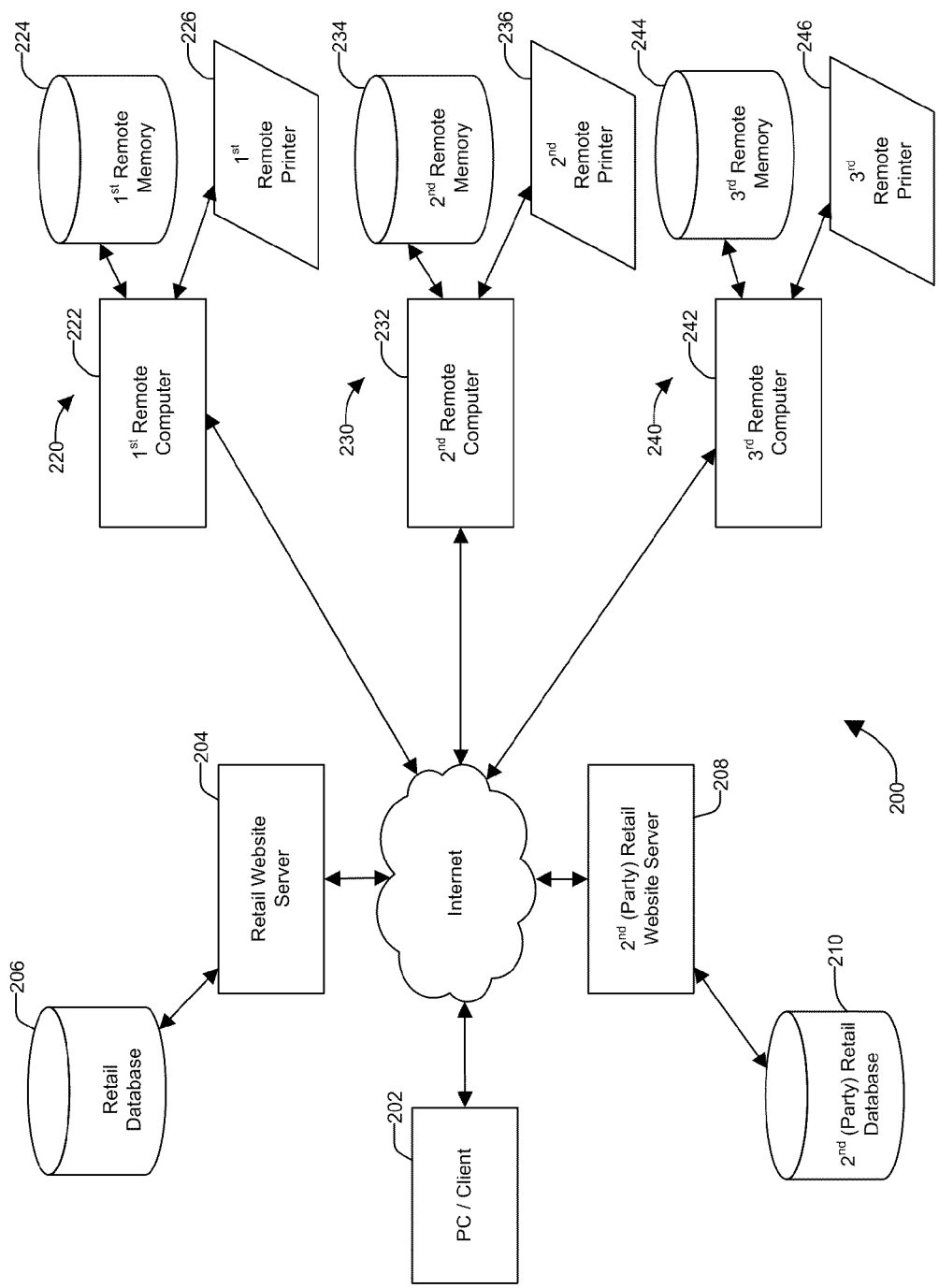
FIG. 2 is a graphical representation of another embodiment of a computer based digital photograph processing and order management system and method.

Referring to FIG. 2, an alternative embodiment to FIG. 1 is shown. Specifically, FIG. 2 is a graphical representation of a computer based digital photographic image print processing system 200. The system 200 includes a first computer 202 having a processor, a user interface display and associated software and hardware for connecting the first computer 202 to the internet or other communications network. The first computer can be a client computer 202 for running a internet browser and for providing access to websites over the internet. The system 200 also includes a retail computer 204, which can host, run and launch a retail application or retail website, and associated interface screens for a first retail application or website, such as an internet service provider website or other traditional retail website, including but not limited to America Online (AOL), Comcast, Google, Yahoo, Amazon, eBay, etc. The client computer 202 can obtain access to the first retail computer 204 and first retail website interface screens within the context of the present invention, over the internet or communications network. A first retail memory 206 and first retail database therein, is in communication with or is associated with the first retail computer 204. The first retail computer 204 can include therein the first retail memory 206.

The system 200 can also include a second retail computer 208 in communication with the first retail computer 204 and the client computer 202 via a communications network, such as the internet. The second retail computer 208 is provided for hosting an application or retail website which has digital photographic image printing functions through which a user can choose from various selections through which requests for digital photographic image printing can be performed. Some of the interface screens through which the digital photographic image printing functions and selections are provided are shown in FIGS. 8-14, as will be described in greater detail below. As understood from these FIGs. and the below description, the interface screens of FIGS. 8-14 can be run, hosted and/or launched from the second retail computer 208 through the first retail computer 204 for display and use of the digital photographic image printing functions and selections at the client computer 202. A second retail memory 210 and second retail database therein, is in communication with or is associated with the second retail computer 208. The second retail computer 208 can include therein the second retail memory 210. The second retail computer 208 can also be considered as a second "party" retail computer 208, in at least an embodiment where the second party retail computer 208 can host at least a portion of a company's operations associated with the uploading and management of digital photographic images and print requests, for printing at remote locations 220, 230, 240 of the company. For example, Walgreen's Co., the assignee of the present application can maintain a website at which digital photographic images can be uploaded to, managed and requests to print such digital photographic images can be performed. In one embodiment, the website pages, scripts, XML calls, etc., through which the uploads can occur, the print requests can be placed, etc., as can be better understood with reference to FIGS. 8-14, are displayed and utilized through the first computer 202, but through the first retail computer 204, and originating from Walgreen's computer systems, as implemented within the second party retail computer 208, and associated memory 210 and systems. In such an embodiment and other embodiments, the remote locations 220, 230, 240 can be WALGREEN CO.'s "drug" stores at which the digital photographic image print requests can be processing and the digital photographic images can be printed for pick-up by the customer (typically the user of the first computer 202 or their friends or family across the country). In a further embodiment, the second party retail computer 208 and associated second party retail memory 210 and databases, can be a "non-company" retail website having at least one primary purpose of receiving uploads of digital photographic images, allowing users thereof to manage their digital photographic images, and allowing users thereof to place digital photographic print requests (traditionally for printing at a remote location and mail order to the customer—the user of the first computer 202), among other purposes. SNAPFISH is one example of such a second party retail website 208.

The second retail computer 208 can also perform functions of tracking and management of at least the availability of remote print processing locations, which can be centralized for efficient digital photographic image print processing. The second retail memory 210 and associated second retail computer can store and execute a central storage and photographic processing software application for which can process and store photographic image print requests for printing of photographic images at remote locations 220, 230, 240 utilizing availability information about the remote locations 220, 230, 240, where printing of the photographic images will take place.

Specifically, the system 200 has first, second, and third remote locations 220, 230, and 240, respectively, for receiving print requests and for processing the print requests for printing on digital photographic image paper stock (die sublimation?) the digital photographic images. The first remote location 220 includes a first remote computer 222, a first remote memory 224 and a first remote digital photographic image printer 226. The first remote computer 222 receives and sends communications from and to the retail computers 204, 208, such as over the internet or other communication network, for processing print requests and for other functions as will be described further below. The first remote computer 222 is operably connected with and in communication with the first remote memory 224 and the first remote digital photographic image printer 226. The first remote computer 222 has a processor and digital photographic print processing application running therein for interfacing and communicating with the first remote memory 224 and the first remote digital photographic image printer 226, and for processing digital photographic image print requests and digital photographic images.

Likewise, the second remote location 230 includes a second remote computer 232, a second remote memory 234 and a second remote digital photographic image printer 236. The second remote computer 232 receives and sends communications from and to the retail computers 204, 208, such as over the internet or other communication network, for processing print requests and for other functions as will be described further below. The second remote computer 232 is operably connected with and in communication with the second remote memory 234 and the second remote digital photographic image printer 236. The second remote computer 232 has a processor and digital photographic print processing application running therein for interfacing and communicating with the second remote memory 234 and the second remote digital photographic image printer 236, and for processing digital photographic image print requests and digital photographic images.

Further, the third remote location 240 includes a third remote computer 242, a third remote memory 244 and a third remote digital photographic image printer 246. The third remote computer 242 receives and sends communications from and to the retail computers 204, 208, such as over the internet or other communication network, for processing print requests and for other functions as will be described further below. The third remote computer 242 is operably connected with and in communication with the third remote memory 244 and the third remote digital photographic image printer 246. The third remote computer 242 has a processor and digital photographic print processing application running therein for interfacing and communicating with the third remote memory 244 and the third remote digital photographic image printer 246, and for processing digital photographic image print requests and digital photographic images. Some or many additional remote locations can be connected and arranged in the same or similar manner, as described above, and as will be described further below.

Figure 3:
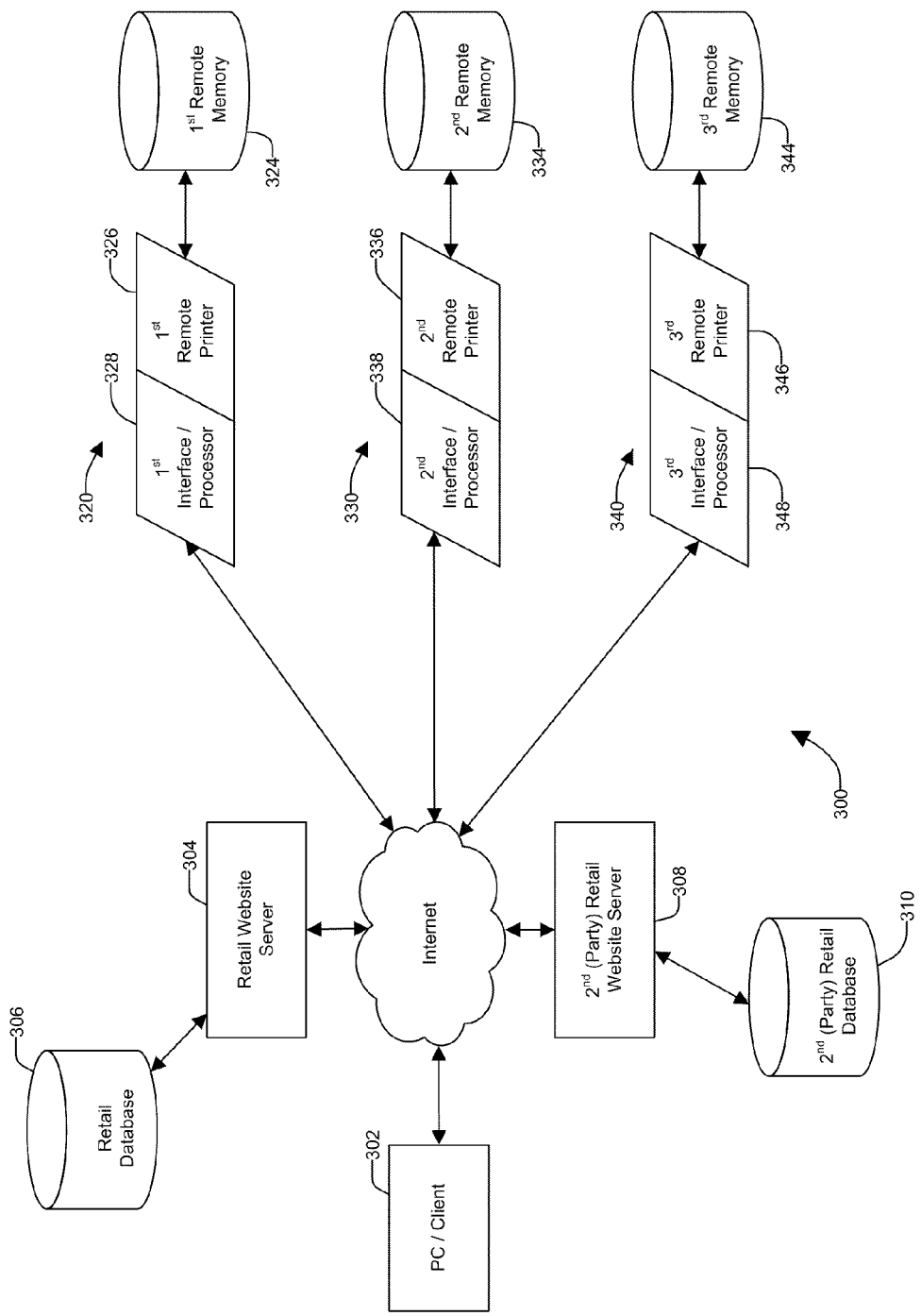
FIG. 3 is a graphical representation of a further embodiment of a computer based digital photograph processing and order management system and method.

Referring to FIG. 3, an alternative embodiment to FIGS. 1 and 2 is shown. Specifically, FIG. 3 is a graphical representation of a computer based digital photographic image print processing system 300. The system 300 includes a first computer 302 having a processor, a user interface display and associated software and hardware for connecting the first computer 302 to the internet or other communications network. The first computer 302 can be a client computer 302 for running a internet browser and for providing access to websites over the internet. The system 300 also includes a retail computer 304, which can host, run and launch a retail application or retail website, and associated interface screens for a first retail application or website, such as an internet service provider website or other traditional retail website, including but not limited to America Online (AOL), Comcast, Google, Yahoo, Amazon, eBay, etc. The client computer 302 can obtain access to the first retail computer 304 and first retail website interface screens within the context of the present invention, over the internet or communications network. A first retail memory 306 and first retail database therein, is in communication with or is associated with the first retail computer 304. The first retail computer 304 can include therein the first retail memory 306.

The system 300 can also include a second retail computer 308 in communication with the first retail computer 304 and the client computer 302 via a communications network, such as the internet. The second retail computer 308 is provided for hosting an application or retail website which has digital photographic image printing functions through which a user can choose from various selections through which requests for digital photographic image printing can be performed. Some of the interface screens through which the digital photographic image printing functions and selections are provided are shown in FIGS. 8-14, as will be described in greater detail below. As understood from these FIGs. and the below description, the interface screens of FIGS. 8-14 can be run, hosted and/or launched from the second retail computer 308 through the first retail computer 304 for display and use of the digital photographic image printing functions and selections at the client computer 302. A second retail memory 310 and second retail database therein, is in communication with or is associated with the second retail computer 308. The second retail computer 308 can include therein the second retail memory 310. The second retail computer 308 can also be considered as a second "party" retail computer 308, in at least an embodiment where the second party retail computer 308 can host at least a portion of a company's operations associated with the uploading and management of digital photographic images and print requests, for printing at remote locations 320, 330, 340 of the company. For example, Walgreen's Co., the assignee of the present application, can maintain a website at which digital photographic images can be uploaded to, managed and requests to print such digital photographic images can be performed. In one embodiment, the website pages, scripts, XML calls, etc., through which the uploads can occur, the print requests can be placed, etc., as can be better understood with reference to FIGS. 8-14, are displayed and utilized through the client computer 302, but through the first retail computer 306, and originating from Walgreen's computer systems, as implemented within the second party retail computer 308, and associated memory 306 and systems. In such an embodiment and other embodiments, the remote locations 320, 330, 340 can be Walgreen's "drug" stores at which the digital photographic image print requests can be processing and the digital photographic images can be printed for pick-up by the customer (typically the user of the first computer 302 or friends or family across the country). In a further embodiment, the second party retail computer 308 and associated second party retail memory 310 and databases, can be a "non-company" retail website having at least one primary purpose of receiving uploads of digital photographic images, allowing users thereof to manage their digital photographic images, and allowing users thereof to place digital photographic print requests (traditionally for printing at a remote location and mail order to the customer—the user of the first computer 302), among other purposes. SNAPFISH is one example of such a second party retail website 308.

The second retail computer 308 can also perform functions of tracking and management of at least the availability of remote print processing locations, which can be centralized for efficient digital photographic image print processing. The second retail memory 310 and associated second retail computer can store and execute a central storage and photographic processing software application for which can process and store photographic image print requests for printing of photographic images at remote locations 320, 330, 340 utilizing availability information about the remote locations 320, 330, 340, where printing of the photographic images will take place.

Specifically, the system 300 has first, second, and third remote locations 320, 330, and 340, respectively, for receiving print requests and for processing the print requests for printing on digital photographic image paper stock the digital photographic images. The first remote location 320 includes a first communications interface and/or processor 328, a first remote memory 324 and a first remote digital photographic image printer 326. The first remote interface/processor 328 receives and sends communications from and to the retail computers 304, 308, such as over the internet or other communication network, for processing print requests and for other functions as will be described further below. The first remote interface/processor 328 can be a part of the first remote printer 326 or can be separate therefrom. The first remote interface/processor 328 and first remote digital photographic printer 326 are operably connected with and in communication with the first remote memory 324. The first remote digital photographic printer 326 and/or first remote interface/processor 328 have a digital photographic print processing application running therein for interfacing and communicating with the first remote memory 324 and for processing digital photographic image print requests and printing digital photographic images.

Likewise, the second remote location 330 includes a second communications interface and/or processor 338, a second remote memory 334 and a second remote digital photographic image printer 336. The second remote interface/processor 338 receives and sends communications from and to the retail computers 304, 308, such as over the internet or other communication network, for processing print requests and for other functions as will be described further below. The second remote interface/processor 338 can be a part of the second remote printer 336 or can be separate therefrom. The second remote interface/processor 338 and second remote digital photographic printer 336 are operably connected with and in communication with the second remote memory 334. The second remote digital photographic printer 336 and/or second remote interface/processor 338 have a digital photographic print processing application running therein for interfacing and communicating with the second remote memory 334 and for processing digital photographic image print requests and printing digital photographic images.

Similarly, the third remote location 340 includes a third communications interface and/or processor 348, a second remote memory 344 and a third remote digital photographic image printer 346. The third remote interface/processor 348 receives and sends communications from and to the retail computers 304, 308, such as over the internet or other communication network, for processing print requests and for other functions as will be described further below. The third remote interface/processor 348 can be a part of the third remote printer 346 or can be separate therefrom. The third remote interface/processor 348 and third remote digital photographic printer 346 are operably connected with and in communication with the third remote memory 344. The third remote digital photographic printer 346 and/or third remote interface/processor 348 have a digital photographic print processing application running therein for interfacing and communicating with the third remote memory 344 and for processing digital photographic image print requests and printing digital photographic images. Some or many additional remote locations can be connected and arranged in the same or similar manner, as described above, and as will be described further below.

Figure 4:
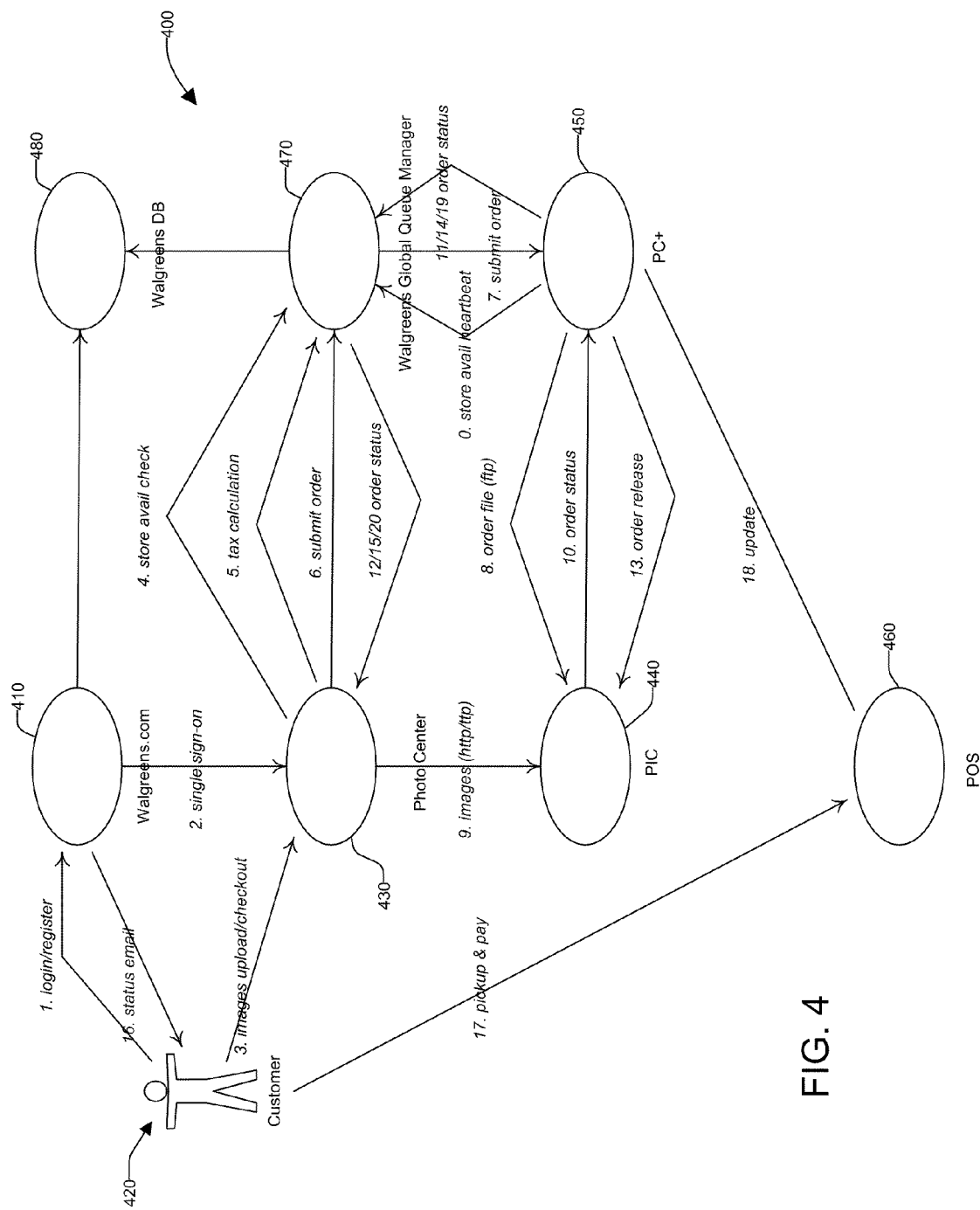
FIG. 4 is a flow diagram of one specific implementation of the embodiments of FIGS. 1, 2 and/or 3.

Referring to FIG. 4, a system 400 and flow diagram thereof is shown, which can be considered as one embodiment of FIGS. 1, 2, 3 and/or other embodiments. The system 400 has a retail or central computer 410, which can host, run and launch a retail application or retail website, such as "WALGREENS.COM", and associated interface screens. A user can interface with the retail or central computer 410 and associated interface screens and functions, such as through a first or client computer 420, which can be networked to and in electronic communication with the central computer 410. The interface screens can take the form of the interface screens shown in FIGS. 8-14, or other interface screens. The system 400 can also have a photo center 430, which, in one form, can be a third party hosted online photo website, such as SNAPFISH.COM website. Users can perform several photo related functions through the photo center 430, such as uploading, downloading, manipulating, editing, sharing, organizing and/or storing digital photographic images to, from and at the photo center 430. Traditionally, users of the photo center 430 could request mail order prints of the digital photographic images for mailing to a physical mailing address of the user's choice, such as the user's home mailing address. The photo center 430 can be networked to and in electronic communication with the user's first or client computer 420. In the context of the present invention, users can select a remote location, 120, 130, 140, 220, 230, 240, 320, 330, 340 for the digital photographic images to be transmitted and printed for user pick-up at the remote location, which in another form can be a retail store of a retail chain that hosts the photo center 430. The photo center 430 also includes application software and hardware components for digital photographic image storage, databases, image transfer and workflow management, and for performing the photo related functions through the photo center 430, such as uploading, downloading, manipulating, editing, sharing, organizing and/or storing digital photographic images to, from and at the photo center 430

The system 400 can also include an image controller (IC) 440 which can be a software application for managing communications, and which can be implemented in at least the remote computers 122, 132, 142, 222, 232, 242, the interface/processors 328, 338, 348, and/or within the remote printers 126, 136, 146, 226, 236, 246, 326, 336, 346. The IC 440 can connect a device and/or application entitled PC+ 450 within FIG. 4 (or picture c are plus) running on the remote computers 122, 132, 142, 222, 232, 242, the interface/processors 328, 338, 348, and in-store minilab (self-serve or otherwise) with the printers 126, 136, 146, 226, 236, 246, 326, 336, 346. The IC 440 is networked to and is in electronic communication with the photo center 430 and to a PC+ 450, and can download digital photographic images and manage the images related to digital photographic print requests and orders, as will be described further below. In one embodiment, the IC 440 can store and execute digital photographic image software from FUJI Corporation or others, and utilize a digital photographic download manager.

The system 400 can also have a traditional point of sale (POS) system 460, which can be networked to and in electronic communication with the PC+ 450 and the user's first or client computer 420. The POS 460 performs all traditional point of sale system functions, such as at least payment functions, order tracking functions, and other functions, as will be described further below. As mentioned above, the PC+ 450 can be a software application running at each remote location 120, 130, 140, 220, 230, 240, 320, 330, 340, and can be included within each remote computer 122, 132, 142, 222, 232, 242, the interface/processors 328, 338, 348, and/or within a photo minilab (self-serve or otherwise) associated with or included within the printers 126, 136, 146, 226, 236, 246, 326, 336, 346. The PC+ 450 manages orders (print requests), work load and customer information. PC+ 450 integrates with the IC 440 and the POS 460 to fulfill digital and analog orders. PC+ 450 also is networked to and in electronic communication with queue manager 470, for providing remote location 120, 130, 140, 220, 230, 240, 320, 330, 340 availability status (of at least the remote printers), as well as order status information for each of the orders be processed at each remote location 120, 130, 140, 220, 230, 240, 320, 330, 340, and elsewhere. In one embodiment, the PC+ 450 runs on TOMCAT application server software, within an AS/400 hardware platform environment.

As mentioned, the system 400 can also include a queue manager 470, which performs central gateway functions, such as managing online digital photo orders, as will be described further below. The queue manager 470 has "Web Services" application interfaces (APIs) to integrate with photo centers 430, including third party photo centers 430. The queue manager 470 is networked to and in electronic communication with the photo centers 430 and the remote locations 120, 130, 140, 220, 230, 240, 320, 330, 340, such as to the remote computers 122, 132, 142, 222, 232, 242 and/or the interface/processors 328, 338, 348. Two of the photo center 430 facing APIs can include remote location availability status and order capture, as will be described below. Two of the remote location facing APIs can include store heartbeat (containing store availability status information) and order status, as will be described below. The queue manager 470 can also perform advanced and highly scalable message queue management functions. For example, the queue manager 470 can manage information flow between third party "partners" (photo centers) and remote locations (stores) in an a-synchronized manner. In one embodiment, the queue manager 470 can run on an IBM BLADE server environment. The queue manager 470 can include application software to perform the above, below described and other functions, and can be hosted on IBM WEBSPHERE architecture and within a Java customer build messaging architecture. The system 400 can also include a database 480 for storing historical information of orders, transactions and operations which have taken place within the system 100, 200, 300, 400.

The systems 100, 200, 300, 400 within FIGS. 1 through 4 depict various computers and hardware components. These computers include a memory element. The memory element includes a computer readable medium for implementing the above mentioned and below described functionality. Specifically, various parts of the systems 100, 200, 300, 400 can be implemented in software, firmware, hardware, or a combination thereof. In one embodiment, the systems 100, 200, 300, 400 are implemented in software, as an executable program, and is executed by one or more special or general purpose digital computer(s), such as a personal computer (PC; IBM-compatible, Apple-compatible, or otherwise), personal digital assistant, workstation, minicomputer, or mainframe computer. Therefore, computers and/or hardware components of FIGS. 1-4 may be representative of any computer or set of computers and hardware components in which the system and method for processing and managing customer orders for digital documents resides or partially resides.

Generally, in terms of hardware architecture, as shown in FIGS. 1-4, the computers and/or servers (and other hardware components) include a processor, memory, and one or more input and/or output (I/O) devices (or peripherals) that are communicatively coupled via a local interface. The local interface can be, for example, but not limited to, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connections to enable appropriate communications among the other computer components.

The processors are a hardware device for executing software, particularly software stored in memory. The processors can be any custom made or commercially available processor, a central processing unit (CPU), an auxiliary processor among several processors associated with the computers/servers (or other hardware component), a semiconductor based microprocessor (in the form of a microchip or chip set), a microprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a POWERPC microprocessor from IBM, a SPARC microprocessor from SUN MICROSYSTEMS, INC., or a 68xxx series microprocessor from MOTOROLA CORPORATION. The processors may also represent a distributed processing architecture such as, but not limited to, SQL, SMALLTALK, APL, KLISP, SNOBOL, DEVELOPER 200, MUMPS/MAGIC.

The memory can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. The memory can have a distributed architecture where various components are situated remote from one another, but are still accessed by the processors.

The software in the memory, such as the various application software mentioned above, may include one or more separate programs. The separate programs comprise ordered listings of executable instructions for implementing logical functions. In the examples of FIGS. 1-4, the software in memory includes the system and method for processing and managing customer orders for digital documents in accordance with the present invention, and suitable operating systems (O/S). A non-exhaustive list of examples of suitable commercially available operating systems is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time VXWORKS operating system from WINDRIVER SYSTEMS, INC.; or (g) an appliance-based operating system, such as that implemented in handheld computers or personal digital assistants (PDAs) (e.g., PALM/OS available from Palm Computing, Inc., and Windows CE available from Microsoft Corporation). The operating systems essentially control the execution of other computer programs, such as the system and method for processing and managing customer orders for digital documents, including the application software mentioned above and below, and provides scheduling, input-output control, file and data management, memory management, and communication control and related services.

The system and method for processing and managing customer orders for digital documents, including the application software mentioned above and below, may be a source program, executable program (object code), script, or any other entity comprising a set of instructions to be performed. When a source program, the program needs to be translated via a compiler, assembler, interpreter, or the like, which may or may not be included within the memory, so as to operate properly in connection with the O/S. Furthermore, the system and method for processing and managing customer orders for digital documents, including the application software mentioned above and below, can be written as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, and Ada The I/O devices may include input devices, for example but not limited to, input modules for PLCs, a keyboard, mouse, scanner, microphone, touch screens, interfaces for various medical devices, bar code readers, stylus, laser readers, radio-frequency device readers, etc. Furthermore, the I/O devices may also include output devices, for example but not limited to, output modules for PLCs, a printer, bar code printers, displays, etc. Finally, the I/O devices may further include devices that communicate both inputs and outputs, for instance but not limited to, a modulator/demodulator (modem; for accessing another device, system, or network), a radio frequency (RF) or other transceiver, a telephonic interface, a bridge, and a router.

If the computers, servers and/or other hardware devices of FIGS. 1-4 are a PC, workstation, PDA, or the like, the software in the memory may further include a basic input output system (BIOS) (not shown). The BIOS is a set of essential software routines that initialize and test hardware at startup, start the O/S, and support the transfer of data among the hardware devices. The BIOS is stored in ROM so that the BIOS can be executed when computers, servers and/or other hardware devices of FIGS. 1-4 are activated.

When computers, servers and/or other hardware devices of FIGS. 1-4 are in operation, the processors are configured to execute the software, such as the application software mentioned above and below, stored within the memory, to communicate data to and from memory, and to generally control operations of the computers, servers and/or other hardware devices, pursuant to the software. The system and method for processing and managing customer orders for digital documents, including the application software mentioned above and below, and the O/S 312, in whole or in part, but typically the latter, are read by processors, perhaps buffered within the processors, and then executed.

When the system and method for processing and managing customer orders for digital documents, including the application software mentioned above and below, is implemented in software, as is shown in FIGS. 1-4, it should be noted that the system and method for processing and managing customer orders for digital documents, including the application software mentioned above and below, or portions thereof, can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The system and method for processing and managing customer orders for digital documents, including the application software mentioned above, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

In another embodiment, where the system and method for processing and managing customer orders for digital documents, or any portion thereof, is implemented in hardware, the system and method can be implemented with any, or a combination of, the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

FIG. 4 is also a flow diagram showing a first exemplar embodiment of the system 100 200, 300 and 400. Specifically, in a first step (1.) the user at the first computer 420, 102, 202, 302 logs into the website/application in the retail or central computer 410, 104, 108, 112, 204, 208, 304, 308. The log in/registration information entered and stored within the memory associated with the retail/central computer 410 can include user name, address (including zip code), credit/debit card or other payment information, password, and/or other information which can be used to identify and make sure that the user is in fact the person that placed the order which will be picked up the remote locations 120, 130, 140, 220, 230, 240, 320, 330, 340. The second time the user logs into the retail/central computer 410, and beyond, the user need only enter their name or user name, and a previously selected or entered password in order to utilize the functions available from the retail/central computer 410. In a second step (2.), in one embodiment, the retail/central computer 410 communicates with the photo center computer 430, and the retail/central computer or photo center computer 430 provides interface pages to the user to upload digital photographic images from the client computer 420. The digital photographic images are stored in a memory associated with the photo center computer 430. For each digital photographic image that the user uploads, the user can at least enter through the client computer 420 the size of each print and the number of prints for each size that the user wishes to order. This order information and/or other order information, such as the price of the order, the order tax, discounts or coupons provided by the user, the e-mail address of the user and/or other order information is then used to generate a print request, which is associated or linked to the digital photographic images for which the order has been placed.

In the process of placing the digital photographic print order, using the user zip code or other location identifier entered by the user from the client computer 420, the photo center computer 430 sends a store availability request to the queue manager computer 470, which checks the availability of the stores (remote locations), for printing of the digital photographic images, located within a predetermined area in relation to the zip code or other location identifier. As identified as step 0. in FIG. 4, the queue manager computer 470 receives from the PC+ computer application 450 on a predetermined time interval basis, such as every five (5) minutes, a "store availability heartbeat", which has particular information therein for communicating to the queue manager computer 470 the availability of the remote location associated with the PC+ computer application 450 application. The availability information communicated within the "heartbeat" to the queue manager computer 470 can include the number of print requests pending at that remote location, the amount of time each pending print request will take, a total amount of time it will take to process such pending print requests, the time it will take the print queue to have sufficient space to receive the download of the digital images, and/or the time or the amount of time that it will take for the remote location to next become available, among other possible availability information. At least this information, and other information identified below, is stored in a memory associated with the queue manager computer 470. Thus, when the photo center computer 430 requests the availability of a certain remote location or a plurality of remote locations within the predetermined area, the queue manager computer responds by communicating back to the photo center computer 430, and thus to the user at the client computer 420, one or more of the availability information, so that the user can select which remote location the user wishes to have the digital image printing occur. As a part of this process, the photo center computer 430 can request and receive from the queue manager computer 470 the local (state, etc.) tax rate which may apply to the price of having the digital images printed, for calculating the total amount to be charged to the user, as shown at step 5. In one embodiment, the photo center computer 430 performs the calculation using the tax information received from the queue manager computer 470, stored in the memory associated therewith.

Once the user selects which remote location to have the digital photographic images printed, the completed digital photographic image print request is communicated from the photo center computer 430 to queue manager computer 470 and onto the selected remote location, as shown in steps 6. and 7. Specifically, after the print request is sent to the queue manager computer 470, the print request is communicated, sent and/or is "submitted" to the PC+ application 450 at the selected remote location. In one embodiment, the digital photographic image print request and the digital photographic images associated therewith are not maintained as a single file and/or are not maintained together. Specifically, the photo center computer 430 and/or the queue manager 470 creates a digital photographic image print request that does not have the associated digital images therein. The associated digital images are maintained in the memory associated with the photo center computer 430. Thus, when the digital photographic image print request is communicated to the remote location (PC+ 450), the associated digital photographic images are not sent to such remote location. This arrangement has many advantages, such as savings remote location memory, enhanced communication speed between at least the photo center computer 430, the queue manager computer 470, and the remote computers/remote processors (PC+ 450) located at the selected remote location.

When the IC 440, which manages the printing of the digital photographic images, and/or the PC+ application 450 have determined that the digital photographic image print request is ready to be processed (such as when the printer queue is empty or has sufficient space to receive the next print order), the PC+ application 450 communicates the print request or order file to the IC (controller) 440 at step 8. This determination can take various different forms. In one embodiment, the IC 440 can communicate to the PC+ application when the just previous print request is completed and therefore that the IC 440 is ready to receive the next print request. In another embodiment, the IC 440 can send a communication to the PC+ application 450 prior to the just prior print request completing, such as when the last print in the just prior print request has started printing. In another embodiment, the PC+ application can send the print request to the IC 440 at a calculated time of when the PC+ has determined that the IC 440 will complete the printing of the just prior print request. Many other embodiments are possible as one of ordinary skill in the art would understand.

In one embodiment, once the print request communicated to the IC 440 has occurred and the IC 440 is ready to process the print request, the IC 440 requests (not shown) the photo center computer 430 to send the digital photographic images associated with the print request to the IC 440 for processing. In another embodiment, the photo center computer 430 will send the digital photographic images associated with the print request to the IC 440 for processing, at a calculated print processing time, which can be communicated from queue manager 470 to the photo center computer 430. Other embodiments are possible to initiate the digital photographic images associated with the print request being sent from the photo center computer 430 to the IC 440, as one of ordinary skill in the art would understand. Once the IC 440 receives all of the digital photographic images associated with the print request to the IC 440, which are stored in an associated memory at the selected remote location, the IC 440 processes the print requests and creates prints of the digital photographic images associated with the print request. Before, during, and after the print processing of the print request is started/completed, the IC communicates an order status message to the PC+ application 450 at step 10, which in turn or after a time interval has passed, communicates the order status message to the queue manager 470 at step 11. The order status message is then communicated from the queue manager computer 470 to the photo center computer 430. This communication can be used to determine when the photo center 430 should send the digital photographic images associated with the print request to the IC 440. In one embodiment, the order status message in step 10. can be used to communicate that all of the digital photographic images have been received by the IC 440. In one embodiment, the PC+ application 450 communicates to the IC 440 a "release" message in step 13, which releases the print request to be printed by the IC 440 and associated printer at the remote location.

Continuing reference to FIG. 4, as well as FIGS. 1-3, at steps 14 and 15, after the printing of digital photographic images relating to the print request is completed, the IC communicates an order status message to the PC+ application 450 at step 10, which in turn or after a time interval has passed, communicates the order status message to the queue manager 470 at step 11. The order status message is then communicated from the queue manager computer 470 to the photo center computer 430 at step 12. The photo center computer 430 can then communicate to the user at the client computer 420, directly or through the retail computer 410, a status e-mail, or other communication such as an automated phone call through an automated calling system (not shown), providing a time that the prints will be ready or that the prints are ready to be picked up at the remote location, at step 16. The communication can also include other information such as the address of the remote location, directions to the get to the remote location using the user's address previously received from the user at the time of the order, a link to directions website, such as MAPQUEST, the price of the order, payment information such as what credit cards are accepted at the remote location. The communication can also include advertisements, coupons or other promotional information for the same, related and/or unrelated goods and/or services which can be purchased when visiting the remote location.

In another embodiment, at step 13, the PC+ application 450 sends an order "release" message to the IC to print the digital photographic images which have already been received from the photo center 430. Proximate in time to this communication or within a time interval thereafter, which may at least depend upon the number of digital photographic images to be printed, the PC+ application 450 sends the order status communication to the queue manager computer 470, at step 14. The order status message is then communicated from the queue manager computer 470 to the photo center computer 430 at step 15. The photo center computer 430 can then communicate to the user at the client computer 420, directly or through the retail computer 410, a status e-mail, or other communication such as an automated phone call through an automated calling system (not shown), providing a time that the prints will be ready or that the prints are ready to be picked up at the remote location, at step 16.

At step 17, the user then travels to the remote location to pick up the prints and pay for the prints. In one embodiment, if the prints have already been paid for online, the user can bring along a receipt printed by the user at the client computer 420, which may include the name of the user, an order number, order details such as the number of prints ordered, a confirmation number, and/or a bar code with some or all of this information and/or other information allowing the point of sale system to confirm that the user has previously paid for the prints. Even if the prints have not previously been paid for, the user photo center computer 430 and/or the retail computer 410 can communicate a receipt to the user computer for the user to print out and bring with them to the remote location for identifying the user's prints belonging to the user. Requiring some form of a confirmation number or other identifier, the employee at the remote location will not end up giving the prints to the wrong person or an imposter. Thus, when the user arrives at the photo counter at the remote location, such the photo counter at a WALGREENS CO. store, the user presents an identifier or other identification of which prints are theirs, and the employee enters this identifier into the POS 460. Alternatively, the user could use a self-serve kiosk to pay for the prints using the identifier, and then provide proof of payment to the employee for receiving the prints. In another embodiment, an automated container with the prints stored therein can be used. The automated container can open to provide access to the user once the user pays for the prints through the kiosk. Within the non-kiosk embodiment, the POS 460 then accepts payment from the employee (received from the user), and the POS 460 sends a communication to the PC+ application 450 updating the PC+ application database that prints associated with the print request have been paid for and/or have been provided to the user. The PC+ application then communicates to the queue manager computer 470 a further order status that the prints for the order have been provided to the user, including details described below. This and/or other order and status information is then communicated from the queue manager computer to the photo center computer 430 and the stored in a memory associated therewith, and is also communicated to the central database 480 used by the retail computer 410, the details of which will be provided below.

Other embodiments are possible as well. Specifically, in one preferred embodiment, a user travels to the remote location to pick up the prints, after having provided credit card or other payment information online, and without a receipt. The user identifies themselves to at the remote location through an driver's license, through visual recognition by a remote location clerk, or in some other manner. The remote location clerk can then enter into a POS 460 that package is being delivered to the user, such as through scanning a bar code on the package that has the identification of the user, the order number, or some other identification information which identifies the order and/or user to the POS 460, that the order has been delivered to the user. This preferred embodiment can also be implemented in the context of the above and below process and system.

As mentioned, at regular time intervals or upon request from the queue manager computer 470, or some other basis, all of the remote locations are communicating status information to the queue manager computer 470 about the status and processing state of all of the print requests pending at the remote location. The queue manager computer 470 tracks which orders or digital photographic images associated with the print requests have been printed and which orders or digital photographic images associated with a print request have not been printed/processed, and which are only in queue to be printed. This arrangement allows for significant flexibility. For example, from time to time, a user may wish to change the remote location at which they want to have the digital photographic images printed. To do so, the interface screens for the retail computer and/or the photo center computer 430 can provide the ability for the user to look up their order by entering an order number, their name or some other information to have recall from memory the order information. The interface screens can then present an option to look up stores or remote locations at which the digital photographic images can be printed and picked up, either by zip code, city, town, area code/phone number prefix, by an interface with a service such as GOOGLE EARTH or other means to identify and look up a store or remote location to choose from. Any list of remote locations presented to the user can provide the up to date status information for each store on the list, including at least the amount of time it will take to have the prints ready and/or a time of day (and day, of not the same day) that the order will be ready. The user can then select the new remote location to have the order printed, and the following will then occur. Different embodiments are possible at this stage. The photo center computer 430 can send a cancel print request to the queue manager computer 470 which in turn sends a cancel print request communication to the PC+ application at the old remote location which will cancel the print request at the old remote location. A new print request is then sent to the queue manager computer 470 and onto the PC+ application at the new remote location, which will then be processed as described herein. In this embodiment, the new print request (which is effectively copied from old print request, if no other modifications are made to it), is associated with the previously uploaded digital photographic images. In this manner, the digital photographic images do not have to be re-uploaded, and can be redirected to a new remote location when the print request is ready top be processed. Further, since the digital photographic images are separated from the print request, the digital photographic images were not yet downloaded to the old remote location, which provides for significant reduction and savings in data transmission. In another embodiment, the same print request stored at the queue manager computer 470 is modified to include the new remote location therein, and is downloaded from the queue manager computer 470 to the PC+ application 450 at the new remote location. The same print request is then canceled at the old remote location, and processing continues is a similar manner as described. Modifications other than or in addition to changing the remote location can be made, such as changing the number of prints in the order, adding additional digital photographic images to the order, as well as other order details. Some changes will require that new or changed print request be implemented, some will not. For changes which require a new or changed print request, a similar process can be implemented as described.

Maintenance can also be performed in an efficient manner using the arrangements and embodiments of FIGS. 1-4. Specifically, updates to the PC+ application 450 and/or to the IC application 440 can be performed from the queue manager computer 470 by downloading updates, including bug fixes, new releases, new revisions, etc. of software, objects, scripts, libraries of information or executable files, and/or other portions of the applications or which are used by the applications to one or more (or all of) the remote locations, and the PC+ application 450 and/or IC application 440.

Various specific software modules can be used to implement the present invention. In one embodiment shown in FIG. 5, a parse order module 510 can be provided to run within or in conjunction with the PC+ application 450 of FIG. 4. The parse order can be invoked by the PC+ application 450 shown in FIG. 4, with order information received by the computer where the PC+ application 450 resides or within an associated computer, such as an AS/400 system. The order module 510 can be a Java program to process an order object or order, and to generate a printer independent file for a download manager (described below) to download files. A generate order module 520 can be provided to run within or in conjunction with the PC+ application 450 of FIG. 4. The generate order module 520 can also be a Java program to generate printer specific order files required for specific types of printers located at each remote location, such as a FUJI printer or an AGFA printer. A heart beat module 530 can be provided to run within or in conjunctions with the PC+ application 450 of FIG. 4. The heart beat module 530 can be a standalone Java program to check the availability of the software on the IC 440 and gather status from IC 440. In addition, the heart beat module 530 checks the status of the processing of the orders at the remote location, and obtains promise times to start, complete or process an order as calculated by the PC+ application 450. The status is then sent to the queue manager computer 470, as indicated above.

A download image module 540 can be provided to run within or in conjunction with the IC 440 and the application therein, of FIG. 4. The download image module 540 can be a Java program which downloads images from the hosting website 544 hosting the digital photographic images, such as the photo center 430 of FIG. 4, and maintains the status of print orders, incoming queue of print orders and downloaded images, and exception queues. The images can be downloaded by location of the images, such as a specific uniform record locator (URL) of where on the internet or related network the digital photographic images reside. The URL address of where the images are located can be encrypted, and decrypted before use to locate and download the images. An IC status module 550 can be provided to run within or in conjunction with the IC 440 and the application therein, of FIG. 4. In one embodiment, the IC status module 550 is a socket server which will respond to requests from the heart beat module 530 and from the generate order module 520. The IC status module 550 reports the status of the orders and downloads of digital photographic images received from the hosting website 544, to the heart beat module. The IC status module 550 further communicates with the download image module 540 and initiates the download image module to perform downloads and other functions. The generate order module 520 also communicates with the IC status module to at least request the start of such downloads. A software manager can be used, such as a WINDOWS executable or "service", for monitoring a folder for software updates, and can run, schedule a WINDOWS batch script to do so. The software manager can be created using an creation application, such as ACTIVATE PERL. In operation within the embodiment of FIG. 5, at step 1, a serialized order object or photographic image print request is received at the parse order module 510. In one embodiment, the parse order module 510 and the generate order module 520 are simple Java "beans" which can be utilized by PC+ application programs to invoke the PC+ application's functionality. As will be explained further in connection with FIG. 6 the order is parsed and generated at step 2. Order files are sent to an FTP (file transfer protocol) server 560 (at the IC) at step 3. The heart beat module 520 communicates with the IC status module 550 through sockets in order to receive and determine the status of the orders at the IC application, at step 4. The generate order module 2 will then request the IC status module 550 to start the download of the digital photographic images, and the IC status module 550 requests the download image module 540 to request the hosting website 544 to download the digital photographic images to the IC, at steps 5 and 6. The hosting website 544 then downloads the digital photographic images to and through the FTP server 560, which in one embodiment can have a passive FTP connection and in another embodiment can be an HTTP transfer. After the download begins and/or is completed, the download image module 5 places the digital photographic images or file containing one or more digital photographic images in a "hot" folder for the printer connected to the IC, to print the images. The IC status module 550 continues to provide a status report to the heart beat module 530, as shown at step 7.

Figure 5:
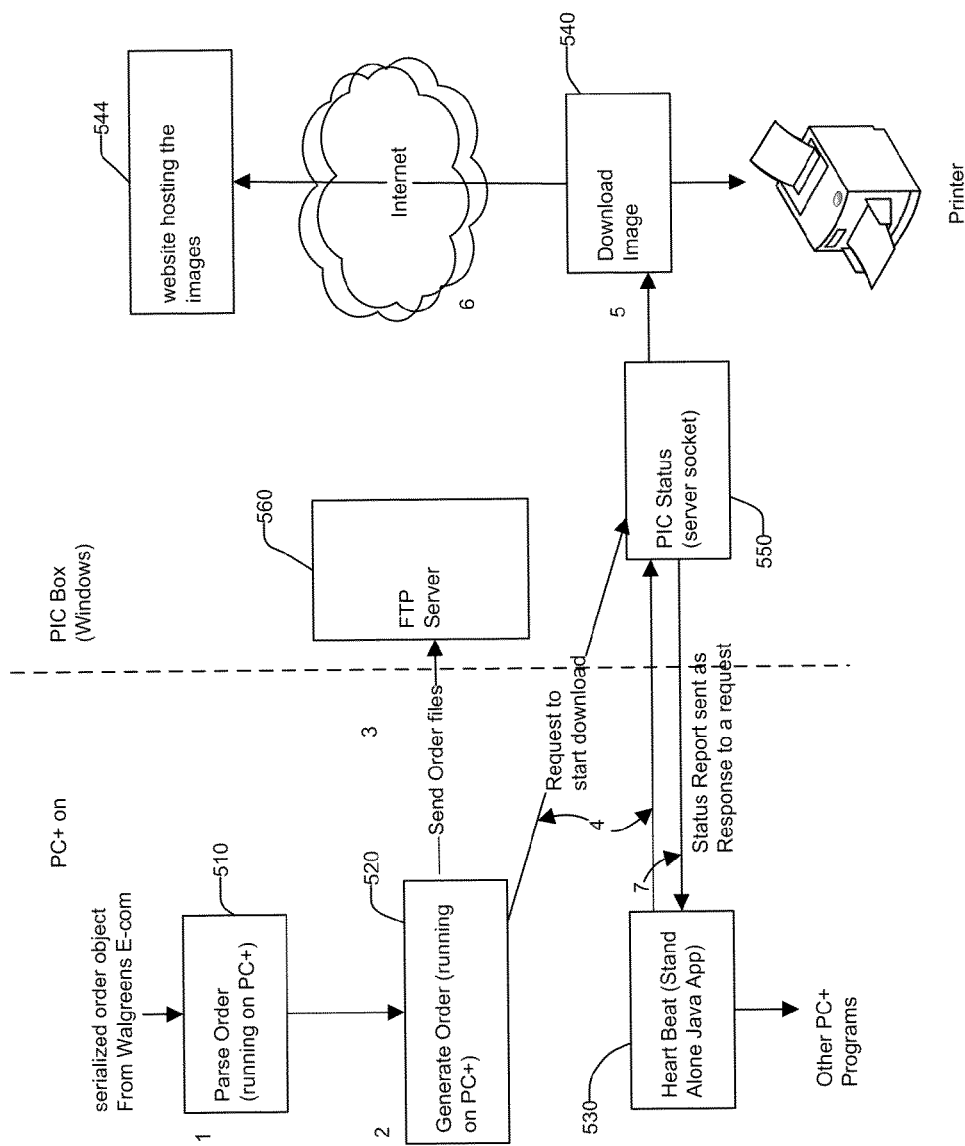
FIG. 5 is an order processing flow diagram and graphical representation of one implementation of the embodiments of FIGS. 1, 2 and/or 3.
Figure 6:
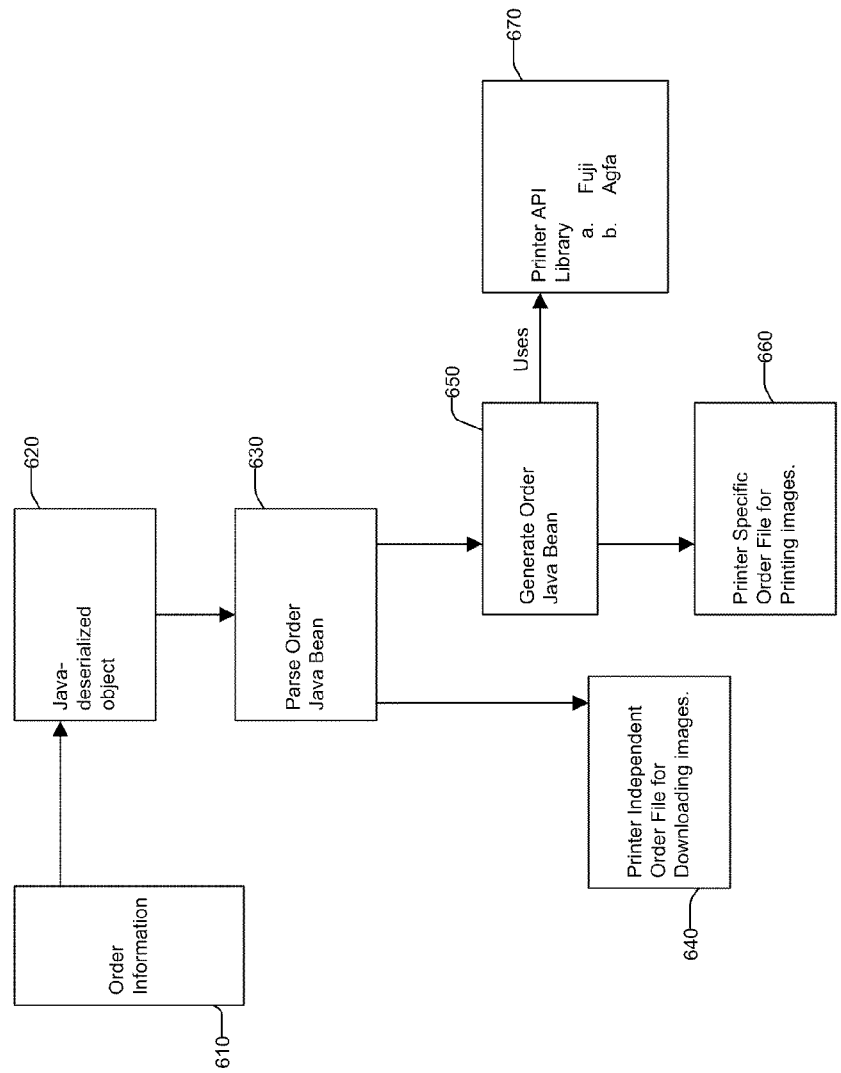
FIG. 6 is a further flow diagram and graphical representation of one implementation of the embodiments of FIG. 5.

Referring to FIG. 6, a parse order and generate order process flow diagram is shown. In one embodiment, order information 610, which will be more fully described below, is a serial Java object. This order information is deserialized at a deserialize step 620, and the deserialized order object is passed to the parse order Java bean 630. The parse order Java bean 630 generates a printer independent order file 640 for the download manager or download image module 540, shown in FIG. 5, to download files/images. A generate order Java bean 650 is provided to generate a printer specific order file 660, using a printer API library 670 stored in a memory associated with the PC+ application/device 450, shown in FIG. 4. The generate order module 520 of FIG. 5 sends or communicates the printer independent and printer dependent order files to the IC application/device 440, shown in FIG. 4. The generate order module 520 sends a communication to the IC status module and/or servlet therein to start or initiate the download process, to download the digital photographic images from the photo center computer 430.

Figure 7:
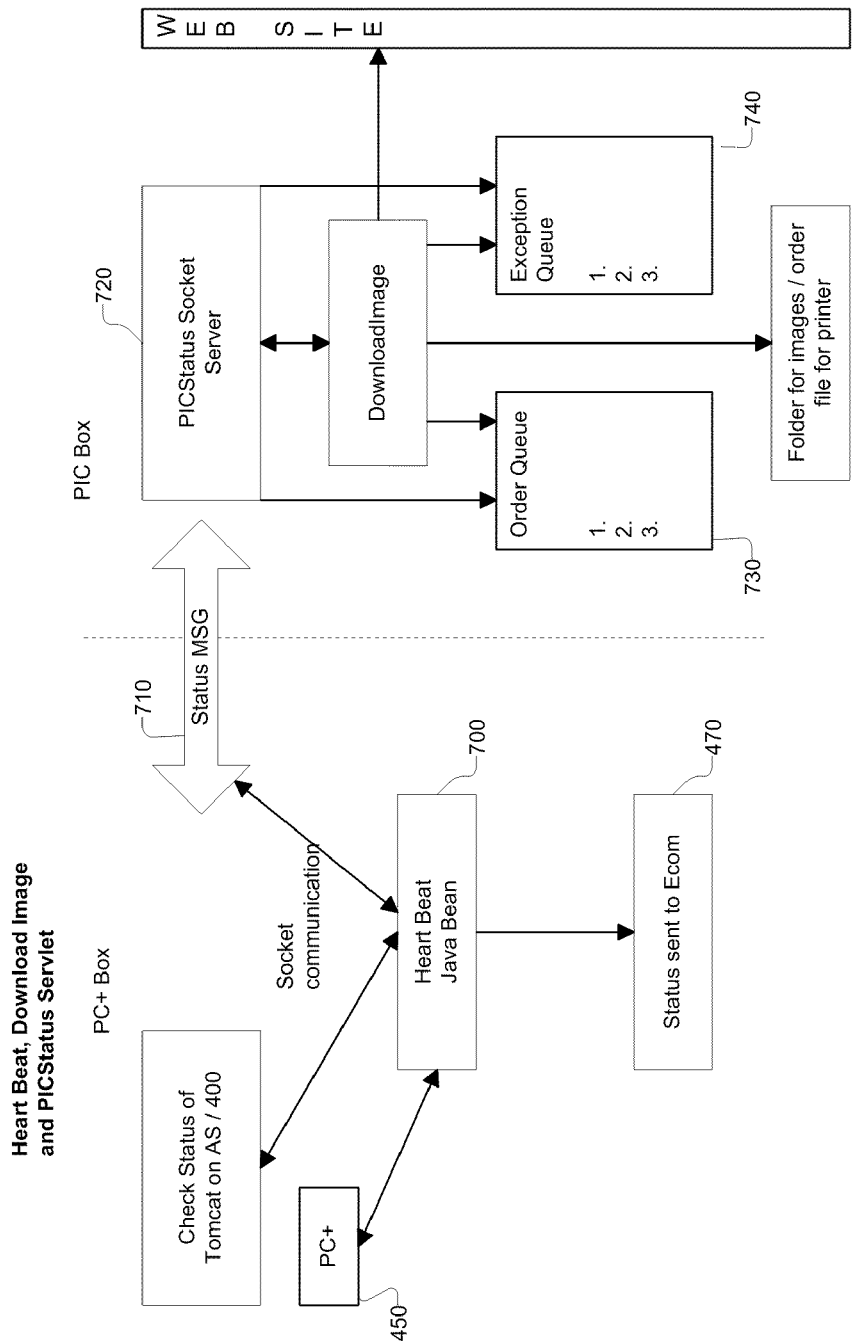
FIG. 7 is a further flow diagram and graphical representation of one implementation of the embodiments of FIG. 5.

Referring to FIG. 7, heart beat and download image processes are shown in relation to hardware and software module arrangements previous described. In particular, a heart beat Java bean 700, such as a stand alone Java program running on the PC+ computer 450, shown in FIG. 4, such as an A/S 400, can be provided to check the availability of an open-source application that hosts PC+ application, such as a TOMCAT, check the availability of the computer programs used for print processing on the IC 440 shown in FIG. 4, and obtain the order processing/print status message 710 from the IC 440 as well as the promise times (which have been communicated to the user) from the PC+ application 450, and communicate this information to the queue manager 470 every n minutes. The status message can be a text string which is passed from the download manager 720 to the heart beat bean 700. An order queue 730 and an exception queue 740 are provided and maintained by the download manager 720 for tracking and managing downloads, such as initiating downloads, making sure each downloaded image is fully transmitted, as well as other management functions. One example of an exception within the exception queue 740 can be when a download does not perform correctly, such as a data transmission error which may need to be repeated in order for the digital images to be downloaded correctly before printing. Another exception within the exception queue 740 can be when the download manager 720 could not download the digital images after several tries, and the exception queue will keep the order file for future downloading. The exception queue 740 is configurable, including being able to set the number of tries for download, the frequency to process the orders within the exception queue, the time when both of the queues are to be emptied, as well as other parameters for the queues. The order queue 730 keeps track of the orders downloaded by the download manager 720 in a specific order, and the order queue 730 will keep track of the status of each order within the queue. In one embodiment, the parse order modules and parse and validate steps will return the order information object, or return an error. In addition, the generate files step will take the order information object as a parameter and generate the printer specific and printer independent files. Further, a send files to the IC step can FTP the files and call a servlet on the IC.

As mentioned herein, the IC 440, shown in at least FIG. 4 and FIG. 7, has a software manager which can be a windows .exe/service. The software manager can be written in ActiveState Perl and ActiveState PerlApp can be used to make it a windows service. The software manager can monitor a folder for any software updates to be run, which for example could come in as a jar file. The software manager would then extract the jar file and execute a predefined batch script (windows batch file). The software manager would then remove the software update jar file from the directory. The software manager can also monitor a folder on the PC+ 450, and can use FTP. The parameters of the FTP server and folder can be configured for the particular application. If the software manager finds a file, the software manager will get the file through ftp, "unjar" it and execute a batch file. The batch file or script can include information on how and when to deploy the software update.

As described above, the parse order, generate order and heart beat modules 510, 520, 530, shown in FIG. 5, can be Java programs, and can run on the PC+ computer 450, shown in FIG. 4. In one embodiment, the parse order module 510 is an "offshore" module. One meaning of offshore includes not being located at or residing on the PC+ computer 450, such as being located on the queue manager 470, but being run or executed from the PC+ computer 450. In this embodiment, the generate order module 520 is also an "offshore" module and the heat beat module 530 is an onshore module, meaning being located at or residing on the PC+ computer 450, and being run or executed from the PC+ computer 450. If located offshore, a local file can include the network location or address of where the module can be found and called for execution. Likewise, the IC status module 550, the download image module 540, and the software manager module can be Java programs, and can run on the IC 440, shown in FIG. 4. In one embodiment, the IC status module 550 can be an offshore module, the download image module 540 can be on offshore module and the software manager can also be an offshore module. A local configuration file can store the settings for and locations of these modules.

In one or more of the above and below embodiments, a hash function, can be used in a one way operation for transforming a data string of any length into a shorter, fixed value length. As understood by one of skill in the art, no two strings will produce the same hash value. An hash function checksum verifies the data integrity by running a hash operation on the data after it is received. The resultant hash value is compared to the hash value that was sent with the data. If the two values match, this indicates that the data has not been altered or tampered with, and its integrity may be trusted. One implementation of this hash function can include the generation of the order file. As part of the printer independent order file generated by parse order module 510, the checksum for each image will be present. The checksum can be generated by the photo center computer 430, retail computer 410, or other photographic website. After each digital photographic image is downloaded by download manager module 540, the download image manager module 540 also generates a checksum and compares it with the checksum of the digital photographic image sent by the photo center computer 430, retail computer 410, or other photographic website photo website. If the checksum matches then the file is correct, otherwise the download manager module 510 requests retransmission or re-downloading of the file and image(s).

As described above, orders are generated at a retail or other computer, 104, 108, and transmitted to a centralized computer such as central computer 112. The order can also be sent to a local or remote computer, such as remote computer 122, 132, 142 which can perform functions for one or more remote locations, within the order capture process. The order message is validated and stored within an associated central database. The order message can include various fields and parameters for use within the present system and method. In one embodiment, an order received from a retail or other computer can include the following elements and fields within the order message or communication. The following is a chart of possible elements within an order message:

| Element Name (See Below) | Element Description |
|---|---|
| Order Info | order level information |
| Order Item Info | Item level information |
| Promotion Summary Info | promotion level information |
| Tax Info | tax information |
| Billing Address | Child Element |
| Shipping Address | Child Element |

The following is a chart of fields used within the Order Info element of the order message. Each field can have an associated Java object.

| Field Name | Field Description | Type |
|---|---|---|
| Vendor ID | Numeric ID per vendor (Vendor ID is 01) | String |
| Vendor Order ID | This is the same as Cart ID - Will start at 100000000 | String |
| Developing Type | States whether the order is same day or next day. | String |
| Order Type | The type of order(Print - REP vs. Gift - GFT) | String |
| Fulfillment Type | Store order vs. Mail order (S or M) | String |
| Store Number | Store Number of remote location | String |
| Promised Time | The time that the store promised the customer to have the order done by. (mm/dd/yyyy hh24:mm) | Date |
| Order Placed Timestamp | The timestamp of when the current order was placed at vendor. (mm/dd/yyyy hh24:mm:ss) | Date |
| Order Sub Total Price | The sub total price of the order without shipping and handling. Without discounts. Total Price Before Discounts | Big Decimal |
| Total Order Discount | The total amount discounted on the entire order | Big Decimal |
| Order Freight | The freight amount | Big Decimal |
| Order Tax | The total tax for the entire order. For store pick-up, the tax will be an estimate. | Big Decimal |
| Ship To Method | The method used for shipping | String |
| Credit Card Number | The credit card number | String |
| Credit Card Expiration Date | The expiration date of the credit card. (mmyy) | Date |
| Retail website Customer ID (such as Walgreens.com ID) | (WAG.com) customer ID | String |
| Vendor Customer ID | Vendor Customer ID | Integer |
| Customer Last Name | Customer Last Name | String |
| Customer First Name | Customer First Name | String |
| Area Code | Area Code of customer | String |
| Phone | Phone Number of customer | String |
| E-mail address | E-Mail Address of customer | String |
| Promotion Summary | Child Element (Collection) | Promotion Code Bean |
| Order Item Info. | Child Elements (Collection) | Order Item Bean |
| Tax | Child Elements | Tax Bean |
| Billing | Child Element | Address Bean |
| Shipping | Child Element | Address Bean |

The following is a chart of fields used within the promotion summary element of the order message. Each field can have an associated Java object.

| Field Name | Field Description | Type |
|---|---|---|
| PLU Number | The Price Look Up Number | Integer |
| PLU Type | State whether the PLU is an order level or an item level PLU (O or I) | String |
| Quantity Applied | The total quantity applied for the product. | Integer |
| Total Discount for PLU | The total discount for a specific PLU. (discount × quantity) | Big Decimal |

The following is a chart of fields used within the Order Item Information element of the order message. Each field can have an associated Java object and some fields may be optional and some may be required depending on the embodiment.

| Field Name | Field Description | Type |
|---|---|---|
| Vendor Product ID | The vendor product ID. To get the PC+ product ID, a table lookup will need to occur. | Integer |
| Unit Price | The price per item | Big Decimal |
| Product Price Before Discount | The regular price for the product. Not the unit price. Before discount (unit price * quantity) | Big Decimal |
| Product Discount Total | The discount for the product. Discounts include both Order Level and Item Level discounts. | Big Decimal |
| Product Quantity | Total quantity for this product | Integer |
| Order Item Image | Child Element (Collection) | Order Item Image |

The following is a chart of fields used within the Order Item Image element of the order message. Each field can have an associated Java object and some fields may be optional and some may be required depending on the embodiment.

| Field Name | Field Description | Type |
|---|---|---|
| Image URL | URL of the image | String |
| Print Quantity | The total number of prints per item | Integer |
| File Size | File size of the image (in kb) | Integer |
| MD5 Checksum | A check sum used for size verification | String |

The following is a chart of fields used within the Tax Information element of the order message. Each field can have an associated Java object and some fields may be optional and some may be required depending on the embodiment.

| Field Name | Field Description | Type |
|---|---|---|
| Transaction Type | type of transaction ((P)urchase or (R)efund) | String |
| County | County | String |
| City | The Jurisdiction City | String |
| State | The Jurisdiction State | String |
| Zip Code | The Jurisdiction Zip Code | String |
| City Limits | City Limits In(I) Out (o) | String |
| Order Transaction Timestamp | The time that the credit card was charged/credited. | Date |
| Product Tax | Child Element (Collection) | Product Tax Info. |

The following is a chart of fields used within the Order Product Tax Information element of the order message. Each field can have an associated Java object and some fields may be optional and some may be required depending on the embodiment.

| Field Name | Field Description | Type |
|---|---|---|
| Product ID | The Product ID | String |
| City Tax Rate | The City Tax Rate | Double |
| City Tax Amount | The City Tax Amount | Double |
| State Tax Rate | The State Tax Rate | Double |
| State Tax Amount | The State Tax Amount | Double |
| County Tax Rate | The County Tax Rate | Double |
| County Tax Amount | The County Tax Amount | Double |
| Gross Sales | The quantity times the Unit Price. Does not take discounts into account. | Double |
| Quantity | The quantity at the item level | Integer |
| Tax Code | The tax code | Integer |
| Taxable Gross | Does take discounts into account. | Double |
| Transit Tax Rate | The Transit Tax Rate | Double |
| Transit Tax Amount | The Transit Tax Amount | Double |
| Sec City Tax Rate | The Sec City Tax Rate | Double |
| Sec City Tax Amount | The Sec City Tax Amount | Double |
| District Tax Rate | The District Tax Rate | Double |
| District Tax Amount | The District Tax Amount | Double |
| Tax Amount | The Tax Amount | Double |

The following is a chart of fields used within the Order Billing Information element of the order message. Each field can have an associated Java object and some fields may be optional and some may be required depending on the embodiment.

| Field Name | Field Description | Type |
|---|---|---|
| Address Type | A decode stating that the address is a billing address. | String |
| First Name | First Name of person being billed | String |
| Last Name | Last Name of person being billed | String |
| Street Address | Street address of person being billed | String |
| City | City of person being billed | String |
| State | State of person being billed | String |
| Zip Code | Zip of person being billed | String |
| Zip plus 4 | Zip extension of person being billed | String |
| Country_CD | The abbreviation of the name of the country item is being billed to | String |

The following is a chart of fields used within the Order Shipping element of the order message. Each field can have an associated Java object and some fields may be optional and some may be required depending on the embodiment. This information is used when a selection is made for the prints to be shipped to the user, instead of for pick up at a remote location. The user can be provided a choice of one or the other through the retail computer interface screens provided at the client computer, or through other interface screens.

| Field Name | Field Description | Type |
|---|---|---|
| Address Type | A decode stating that the address is a shipping address. | String |
| First Name | First Name of person being billed | String |
| Last Name | Last Name of person being billed | String |
| Street Address | Street address of person being billed | String |
| City | City of person being billed | String |

-continued

| Field Name | Field Description | Type |
|---|---|---|
| State | State of person being billed | String |
| Zip Code | Zip of person being billed | String |
| Zip plus 4 | Zip extension of person being billed | String |
| Country_CD | The abbreviation of the name of the country item is being billed to | String |

Once the Order message or messages are received, the receiving computer or portion of the system which receives or "captures" the Order message or messages can provide a response message. The following are charts of fields used within response messages. Each field can have an associated Java object and some fields may be optional and some may be required depending on the embodiment. The following is a chart which includes one embodiment of the fields of an order response error message.

| Field Name | Field Description | Type |
|---|---|---|
| Is Success | Called to see if message was processed successfully. | boolean |
| Vendor Order ID | The vendor provided order ID number. | String |
| Time Stamp | The time that the message was received. | Date |
| Message Type | Type of message encapsulated in the response. | String (10) |
| Error Code | If error message, this will be populated with the code of error. | integer |
| Error Message | If error message, this will explain the error in detail. | String (80) |

The availability of a remote location, such as how many print jobs or orders are queued for printing and the size of such print jobs, is tracked through the central computer, such as the queue manager computer 470 of FIG. 4, or centralized remote computer. Store or remote location availability messages provide promise time information to external components such as the photo center computer 430 of FIG. 4, or other retail computer. The calculate promise time module calculates the earliest order promise times for remote locations that are listed in the store or remote location availability request message (which can be dependent on factors such as zip code and distance). The calculate promise time module will return calculated order promise time data in a remote location or store availability response message. The calculate promise time module will also record success and error events based on the message validation, promise time calculation, and response message delivery results. The following is a chart of fields in one embodiment of a remote location availability request message, which contains order size information and a list of requested remote locations.

| Field Name | Field Description |
|---|---|
| Total Image Size | The total size of digital image files in Kb |
| Output Type 1 | Type of output that is included in the order (e.g. 4 × 6) |
| Number of Prints for Type 1 | The total number of prints for the type above |
| Output Type N | Type of output that is included in the order (e.g. 8 × 10) |
| Number of Prints for Type N | The total number of prints for the type above |

-continued

| Field Name | Field Description |
|---|---|
| Store Number 1 | store the promise time is requested for |
| Store Number N | store the promise time is requested for |

Availability request Java beans associated with the above availability request fields can also contain the image size, collection of product type beans, and collection of store/remote location numbers.

In response to the availability request message, a central or centralized computer, such as the queue manager computer 470 of FIG. 4, can generate and communicate an availability response message. The availability response message can contain store or remote location information, remote location promise time information for all "available" stores that were sent in a store availability request message. In one embodiment, the availability response message can contain the following fields. Each field can have an associated Java object and some fields may be optional and some may be required depending on the embodiment.

| Field Name | Field Description | Type |
|---|---|---|
| Is Success | Called to see if message was processed successfully. | String (10) |
| Message Type | Type of message encapsulated in the response. | String (10) |
| Error Type | If error message, this will be populated with the type of error. | String (10) |
| Error Message | If error message, this will explain the error in detail. | String (80) |
| Store Status MBean | Contains Store numbers and availability. | Collection |

| Field Name | Field Description | Field Length |
|---|---|---|
| Store Number 1 | store number for the following promise time | 5 |
| Store Availability 1 | 1st available promise time for the above store number | Date |
| Store Number N | store number for the following promise time | 5 |
| Store Availability N | 1st available promise time for the above store number | Date |

The availability response bean(s) can contain a collection of store status beans for every remote location or store.

As can be understood by one of skill in the art, the field data and information within the above tables and charts can be used in the context of FIG. 4 and the respective computer systems, devices and associated software described herein in relation to FIG. 4, such as for example in generating and/or communicating the requests and in storing, generating and/or communicating responses to the requests.

As described above, in one embodiment, a retail website or computer can receive uploads of digital photographic images and requests for printing of such images through the remote locations. For example, this system allows traditional in-store drug store photographic printing lab systems to accept customer orders and digital images from third party websites and vendors using a unique inbound PULL (FTP/HTTP) process. In general, the customer or user uploads the digital images and places an order at the website or retail computer for in-store pickup, which will be further described below with reference to the interface screens used to place such orders.

The drug-store chain can have a central software component residing on a central computer which receives order information without the images and transmits it to the remote location software at the store. The remote location software component identifies the order images through the Order metadata, as provided in the above tables. The remote location software downloads the images for that particular order from the website or retail computer using either FTP, HTTP or TCP/IP socket communication. The remote location or store software identifies the particular printer model and version available in that particular store and then creates a printer (minilab) specific order pack and then submits that order pack to the printer/printer controller for printing.

Also as described above, in one embodiment, a retail website or computer can receive uploads of digital photographic images and requests for printing of such images through the remote locations. A customer or user can uploads images to the photo website and is ready to place orders. The photo website queries a map website, such as MAPQUEST and the queue manager computer for remote/store locations, remote location availability and promise time. The user selects a remote location and submits an order, and the photo website transmits the order manifest file (containing at least URLs to the images) to the queue manager computer. The queue manager computer then communicates the order manifest file to the specified remote location. The remote location computer/controller application then initiates a FTP download from the URLs in the order manifest file and then prints the images on the remote location printer. The remote location can then communicate the order status information to the queue manager computer and then the photo website. The photo website can then notify the user or customer of the order status, such as that the order is ready for pickup.

In one implementation of this embodiment, XML batch feed occurs from the queue manager computer to the photo website. The XML batch feed can contains all remote location information including address, store hours, photo number, store tax information, and supported print types etc., as can be understood from at least the field information within the tables herein. An XML pricing feed can also occur from the queue manager computer to the photo website. The XML pricing feed can contain pricing information for prints, and other information as can be understood from at least the field information within the tables herein. An XML product group batch feed can also occur from the queue manager computer to the photo website. The XML product group feed can contain information about supported print types, and other information as can be understood from at least the field information within the tables herein. A store locator API, such as an XML based web services API hosted by MAPQUEST, can be used to query the locations of the remote locations or store locations. A store availability API, such as a SOAP web services based real time API call, can be used to retrieve remote location availability information. Further, an order submission API, such as a SOAP web services based real time API call, can be used to submit the order manifest file. Images can be downloaded through a FTP communication from the photo website to the selected remote location. In addition, an XML based API can be used to sent order status to the photo website Referring to FIGS. 8 through 14, digital photograph development and purchasing interface screens are provided for placing a digital photographic image(s) print order. In one embodiment, these interface screens can be provide through a service provider website or other high volume portal of internet users, such as can be AOL, YAHOO, COMCAST, GOOGLE, etc. These screens can also be provided directly by a digital photographic image processing store chain with a plurality of stores, such as a drug store chain with many store locations. One example of such a store chain is the assignee of the present invention, WALGREEN CO.

Figure 8:
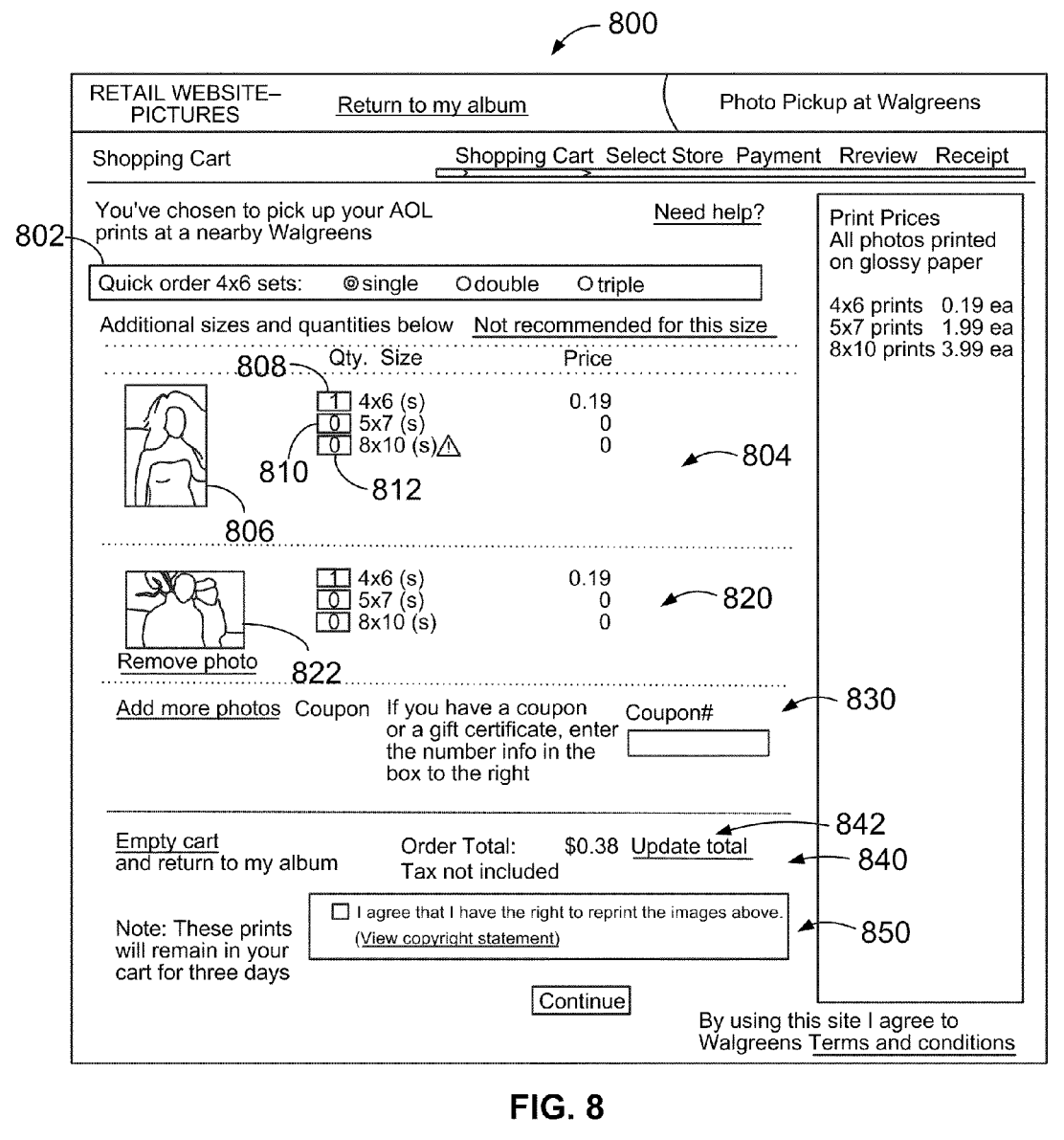

Specifically, FIG. 8 shows a first digital photograph development and purchasing interface screen 800 or shopping cart screen 800. This can be selected after an upload of the digital photographic images has occurred, such as to a user library of digital photographic images within a retail website. The first interface screen 800 allows a user to select single, double or triple prints, in a quick order selector area 802. Prices are provided on the right side of the first interface screen 800 for different size prints, for use in deciding which size to select. A first image area 804 is provided for displaying a first image 806. In the interface screen shown, since the "single" quick order 4×6 button has been selected, a "1" appears in all image areas in the 4×6 quantity box, such as for example a 4×6 quantity box 808 within the first image area 804. The "1" in the 4×6 quantity box 808 can be modified by the user to increase or decrease that amount. A 5×7 quantity box 810 and an 8×10 quantity box 812 are provided for selecting a quantity of these sizes. A price display area 814 is provided for displaying the actual price of the selected quantity for each size selected and the number or prints requested for such sizes. Other sizes are possible as well. A second image area 820 is provided for displaying a second image 822, along with similar options for ordering as the first image area 804.

A coupon area 830 is provided for accepting a coupon code or other coupon identifier, for use in processing any promotions within the final pricing of the order. An order price area 840 is also provided for indicating an ongoing order total price (without tax), so that the user can see the ongoing amount of the total order. The order price area 840 can be updated to show an updated price after each selection or after an update total button 842 is selected. A right to reproduce or reprint copyright statement 850 can be provided for requiring a user to agree that such user has the necessary copyright rights in order to upload, print, reprint, etc. such digital photographic images. Options are provided to move to the user's digital photographic image library, to the next set of images to select for printing page, to a select store screen, to a payment screen, to a review screen, and/or to a receipt screen.

Referring to FIG. 9, a select a remote location or store screen 900 is provided for searching for and selecting a remote location to transmit the order, to download the images to, and for the user to travel to pick up the printed images. In the embodiment shown in FIG. 9, a zip code input field 902 is provided for a user to input a zip code where they are located or where they would like to pick up the prints. A number of miles field 904 is provided for the user to input the number of miles which the user would like the system to check where remote locations are provided or are located. For example, if the zip code 60025 is entered into the zip code input field 902, and the number "5" is entered into the number of miles field 904, the system will check for all remote locations within the zip code 60025 and within five miles outside of that zip code, and such remote locations will be displayed for selection by the user. As mentioned, a mapping system or website service can be used to assist in this process. A street input field 906, a city input field 908, and a state input field 910 are also provided for inputting this respective information, instead of entering a zip code into the zip code input field 902, for entering where the user is located or where the user would like to pick up the prints. The number of miles entered into the number of miles field 904 can also be used with the address information entered into the street input field 906, city input field 908, and state input field 910, in a similar manner as the with the zip code information entered into the zip code input field 902.

Figure 10:
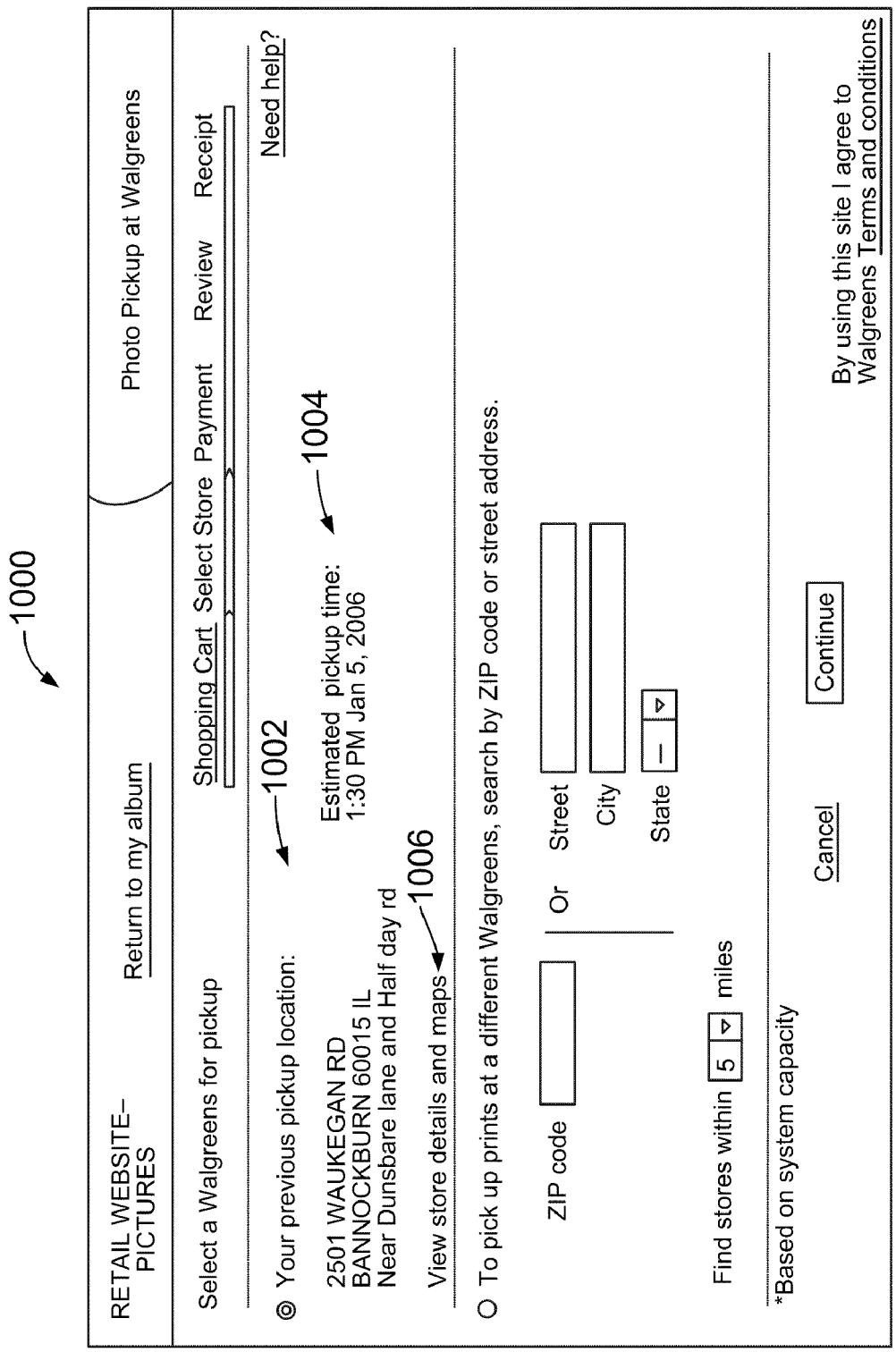
FIG. 10 is further digital photograph development and purchasing interface screen of the embodiments of FIGS. 1, 2, and/or 3.

Referring to FIG. 10, a further embodiment of FIG. 9 is shown with additional information included. Specifically, a select a remote location or previous remote location screen 1000 is provided, wherein the system can recognize that a user has previously ordered prints at one or more remote locations, and can automatically display such previous remote locations in a previous remote location display area 1002. In one embodiment, the system will attempt to drop a cookie containing the previous store number selected, in order to later determine previous remote locations selected. An estimated pickup time 1004 is automatically shown for such previous remote locations displayed, which indicates the amount of time the system estimates the specific remote location will take to print the entire order. As mentioned above, the queue manager tracks the status of each of the remote locations, and can provide the central and/or retail computers/websites with such information for displaying to the user within the process of the user determining which remote location the user would like to select to have the images printed and pickup such prints. Store information, maps, and directions are available by selecting a view store details and map link 1006. Other input fields and functions of the interface screen of FIG. 9 are also provided within the select a remote location or previous remote location screen 1000.

Figure 11:
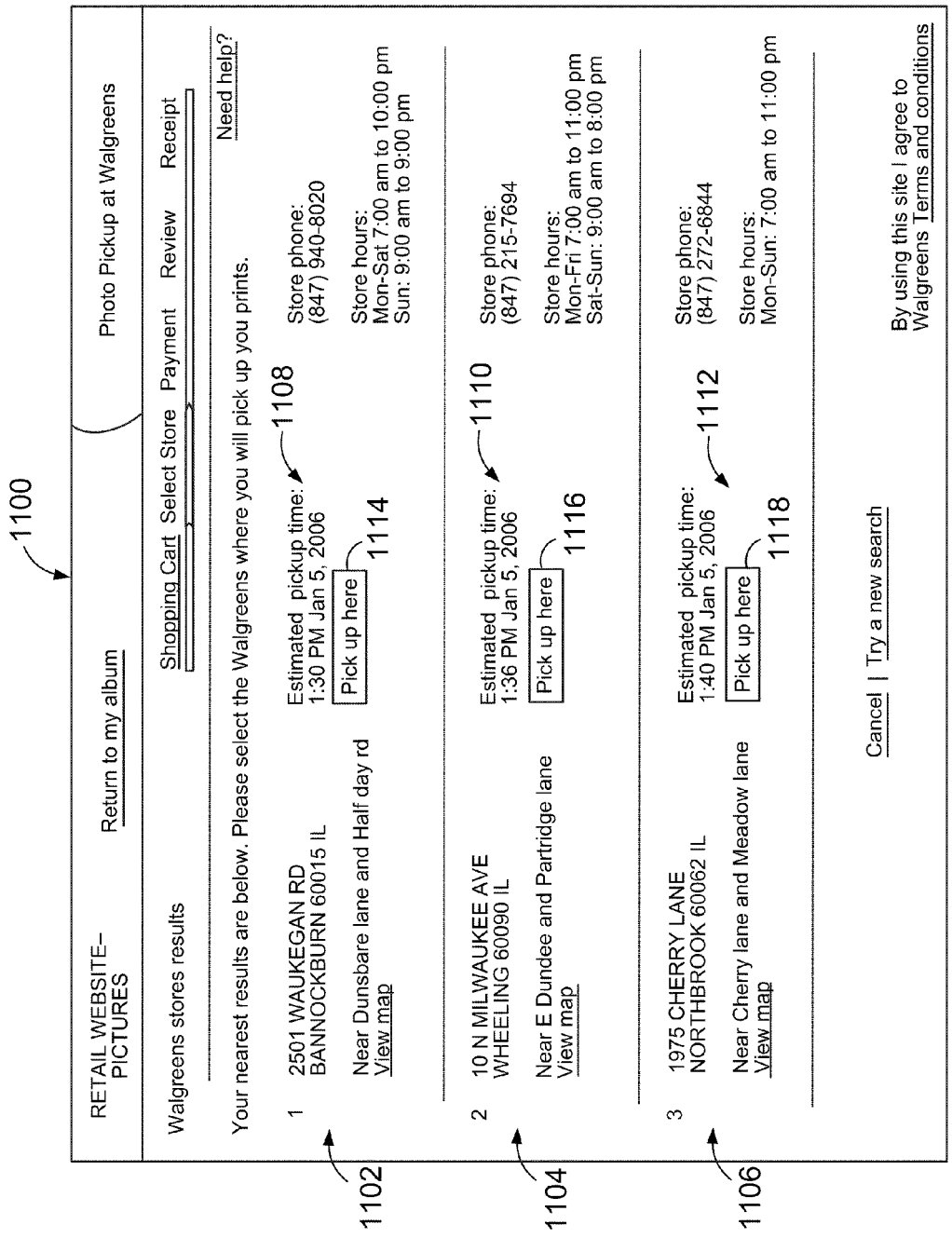
FIG. 11 is further digital photograph development and purchasing interface screen of the embodiments of FIGS. 1, 2, and/or 3.

Referring to FIG. 11, a remote location or store listing interface screen 1100 is provided for displaying the remote locations which satisfy the criteria of the entered information within the select a remote location screen 900 or select a remote location or previous remote location screen 1000. First, second and third remote location display areas 1102, 1004, 1006 are provided for displaying first, second and third remote locations which satisfy search criteria previously entered into previous interface screens. First, second and third estimated pickup time display areas 1108, 1110, 1112 are also provided for displaying the most up to date estimated time it will take to have the prints printed and available for pickup by the user, but displayed based on the current time and adding the estimated time it will take to such current time. A remote location phone number, and remote locations open hours display areas are also provided at the right of each remote location display area to provide the user with this information, to at least factor in this information in their selection process. First, second and third "pick up here" button are provided within each respective remote location display areas 1102, 1104, 1106, for allowing the user to select the specific remote location displayed in such remote location display area 1102, 1104, 1106.

Figure 12:
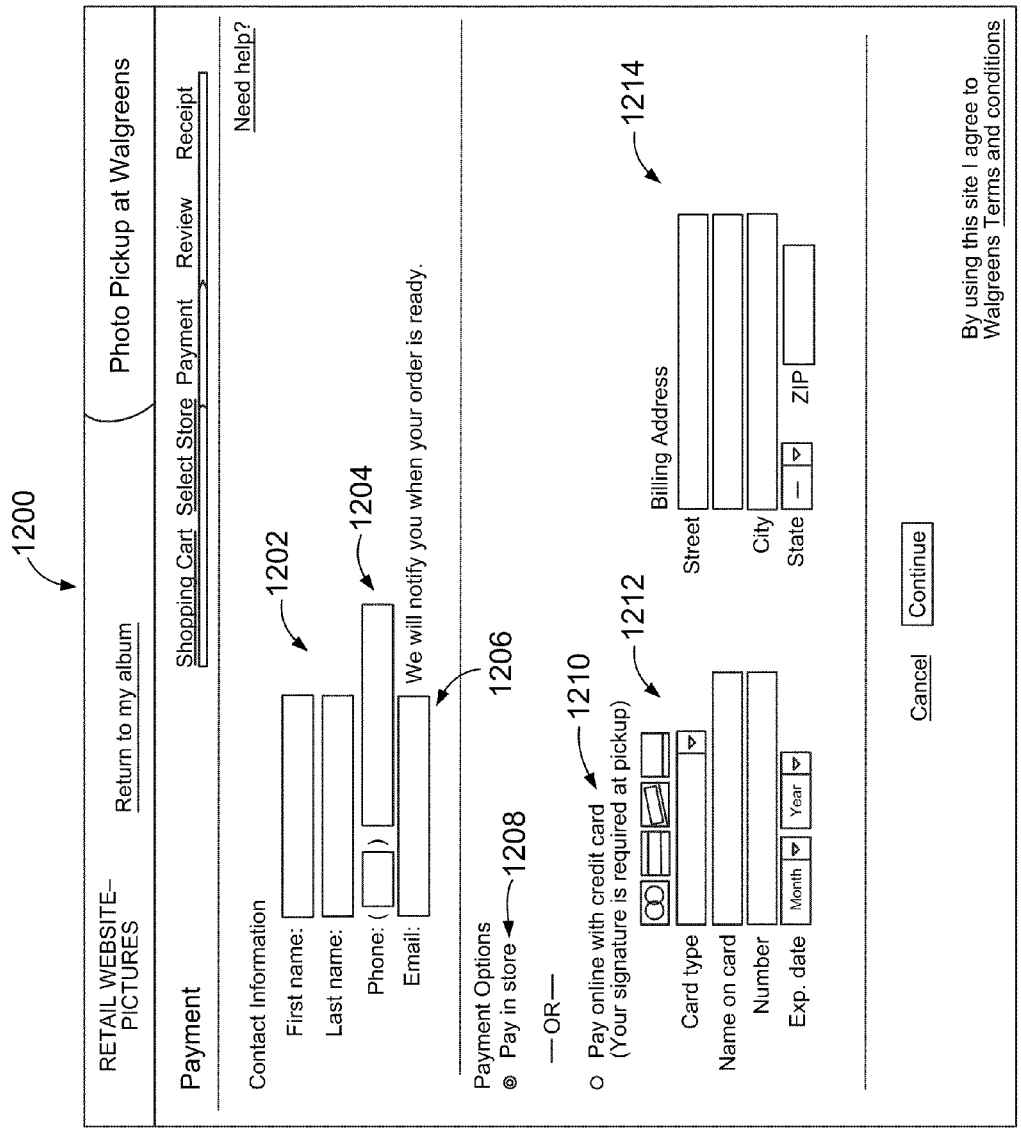
FIG. 12 is further digital photograph development and purchasing interface screen of the embodiments of FIGS. 1, 2, and/or 3.

Referring to FIG. 12, a first payment interface screen 1200 is provided for allowing the user to enter contact information and payment options and information for use in order processing and tracking. Specifically, name, phone and e-mail input fields 1202, 1204, 1206 are provided for the user to enter their name, contact phone number, and their e-mail address where they can be reached and/or where order status updates, such as a "your order is ready" phone or e-mail communication, can be provided to the user. A pay in store selection field 1208 and a pay online with credit card selection field 1210 are provided for the user to select which option they prefer to choose. If the pay in store selection field 1208 is selected, then the system will not require payment until the user appears at the remote location to pick up the prints for the order. If the pay online with credit card field 1210 is selected, then the user can proceed to enter the necessary credit card information and billing address information into credit card input fields 1212 and billing address input fields 1214. Referring to FIG. 13, a second payment interface screen 1300 is provided in situations when the selected number of prints or dollar amount of the order exceeds a predetermined order size or dollar amount. In such situations, the system will not prompt the user with a choice to pay at the store, such as is provided within the first payment interface screen 1200 of FIG. 12 through the pay in store selection field 1208. Only the other entry fields are provided from FIG. 12 within FIG. 13, which forces the user to actually pay by credit card before the system will accept and begin to process the order.

Referring to FIG. 14, an order review screen 1400 is provided to display the significant information about the selections and inputted information the user has performed during the order entry process for review by the user before the user submits the order. Specifically, an order pickup information display area 1402 is provided for displaying the details of the remote location selected for printing and pickup of the order, as well as the estimated pickup time that the order will be ready. An order payment information display area 1404 is provided for displaying the details of the payment information entered for paying for the order. In the embodiment of FIG. 14, the user has chosen to pay for the order by credit card and the associated credit card payment information is displayed within the order payment display area 1404. An edit button is provided to go back and modify any incorrect information, which will take the user back to the payment interface screens 1200, 1300 of FIGS. 12 and 13. A prints order summary display area 1406 is also provided for displaying the size and number of prints ordered as well as the associated itemized cost for such size and number of prints ordered for each such size. If a coupon is used, the reduction in price associated with such coupon is shown. Sales tax and total price is then also shown. A edit order button is also provided for modifying the order, and which will take the use back to the shopping cart screen 800 shown in FIG. 8. A submit order button 1408 is also provided for submitting the order. Once the user selects the submit order button 1408, Steps 3 through 6, with the process shown in FIG. 4 have then been completed, and the remaining steps therein can then proceed.

Within the embodiment of a third party retail website service provider or contact provider displaying or providing the order entry interface screens of FIGS. 8 through 14, such as AOL, various operations can occur to implement such an embodiment. Specifically, an option for a user to selected the specific remote location/store chain can be provided to select such a store chain. Once selected, the user can then either upload their images or begin the ordering process using the interface screens of FIGS. 8 through 14, depending on whether the user had previously uploaded such images into a library or some other retail memory associated with the retail website, as shown in FIGS. 1-3. Once the order is placed the store chain computer system, such one of the first or second retail websites or central server of FIGS. 1-3 can receive an HTTP parameter communication from the customer's browser. The content of the communication can include three hidden parameters: message, which is XML order data; source, which identifies the request coming from the retail website customers; and, key, which identifies the name of the key used to encrypt the order manifest message. The XML order data will be encrypted and the store chain can provide the retail website with the key through a secure channel. The order data can contain a thumbnail and high resolution (high-resolution) image URLs for each image, image resolutions, a vendor ID, a customer ID and/or customer information including names, email address. etc. The thumbnail and image URLs should be available instantly over HTTP. The order data can be uniquely identified by the retail website customer ID. The customer ID can be the retail website screen name for members of such retail website, and/or an email address for the retail website user. To allow customers to quickly go back to the retail website photo area, the order data should contain URLs where customers can return to at the retail website. Once the store chain computer system receives the order data from the retail website, the store chain system will validate required fields and reject any order if any required field is missing. Fields can be designated as required or optional as indicated herein above. After the order data is submitted to the store chain computer system, an independent shopping cart can be created and be stored on the store chain system and associated memory. If another order is passed to the store chain computer system for the same customer ID before an existing shopping is submitted to the remote locations for printing, the store chain can attempt to merge the two existing shopping carts. The system can be set up to purge any unsubmitted shopping carts after a predetermined amount of time.

As a part of the order submission after the submit order button 1408 is selected within FIG. 14, the system will determine if the same shopping cart is being submitted twice and prevent this from occurring. Information from within the order is save at this point, and including the landing URL and image URLs for these two spots. Since the interface screens can be hosted or launched from the store claim computer system or website(s), the ordering and checkout process can be considered as "anonymous." Specifically, the checkout process may require the user to login to the retail website (and/or photo portion thereof), but will not require the user to login to store chain system or website. At the end of the checkout flow, customers should be able to go back to the retail website and remain authenticated, without having to re-log into the retail website, and should also be able to go back and forth between the retail website and the store chain website, during the ordering process, without losing session information.

Returning to the order flow for the present embodiment, the order data will be passed from global queue manager remote locations, as described above herein, with retries when initial passing is not accepted or receipt by remote locations is not confirmed. Images can then be downloaded when the remote location is ready to receive such images for printing, from high-resolution URLs provided by the retail website, over HTTP. Once orders are downloaded, printed, canceled or sold, a status message will be send from remote locations to the queue manager, as described above. The queue manager of the store chain system will forward these status messages to the retail website through HTTP. Transactional emails (order received, order canceled and order ready) can be sent out by the store chain system, and/or by the retail website, with or without a co-branded template for the store chain and the retail website brands. The retail website and/or the store chain system can maintain order history in associated memory Thus, the present invention at least provides that the ability to create a promise time for customers based on one or more of work pending in each store, availability of the store equipment, type of store equipment, and store hours. As mentioned the central computer, such as the queue manager computer, is updated with each store's availability based on information accumulated by PC+ computer/application. This information can measure all aspects of the work facing the remote location clerk including roll processing, enlargements, kiosk, and work on other devices such as an ink jet refill machine. This information also lets the central computer provide the internet customer/user a promise time that can be realistically met by the remote location/store. In addition, the system allows orders to be processed on different types of printing equipment at the remote locations in the store, by determining what type of equipment the remote location/store has, and to format the order information uniquely for each printer and device. Further the progress of the orders can be independently monitored, as at least order information becomes visible to the clerk as soon as the order information reaches the remote location/store, not just after the images are downloaded. In addition, from information in the PC+ computer/application work queue, the clerk at the remote location is provided information on when the order has completed downloading or if a problem has been encountered. Further, downloaded orders to the remote locations will be tracked through the queue manager, and orders that have not been acted upon in an appropriate amount of time will trigger a reminder phone call, network message, e-mail or other communication to the store to follow up. This central monitoring provides many advantages. The statuses and central tracking thereof includes at least customer order entry time, remote location or store received time, remote location or store downloaded time, order printed time, and order sold time. In addition, the system provides the ability for the remote location or store to track the progress of the order, as the PC+ computer/application tracks and stores a history of the order including time downloaded, time printed, and time sold.

Any process descriptions or blocks in the figures, such as FIGS. 4-7, should be understood as representing modules, segments, or portions of code which include one or more executable instructions for implementing specific logical functions or steps in the process, and alternate implementations are included within the scope of the embodiments of the present invention in which functions may be executed out of order from that shown or discussed, including substantially concurrently or in reverse order, depending on the functionality involved, as would be understood by those having ordinary skill in the art.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the present invention and protected by the following claims.

What is claimed is:

1. A computer readable storage medium having a computer executable program embodied therein for causing a computer to execute a method for processing and managing customer orders for digital photographic images through a network, the computer executable program configured to carry out the steps comprising:
   receiving at a central server a first digital image print request from a second computer;
   receiving a selection of a first remote location identification to have the digital image printed at a first remote location associated with the first remote location identification;
   sending to the first remote location a second digital image print request to have the digital image printed, without triggering a sending of the digital image to be printed to the first remote location; and
   transmitting by the central server a third request to a digital image repository storing the digital image for obtaining from the digital image depository the digital image to be printed at the first remote location.

2. The computer readable storage medium of claim 1 wherein the first remote location comprises a first remote computer for receiving the second digital image print request to have the digital image printed, a first remote memory for storing the second digital image print request to have the digital image printed, and a first remote printer in communication with the first computer for printing the digital image.

3. The computer readable storage medium of claim 2 wherein the second computer is a client computer, and wherein the method further comprises the steps of:
   transmitting to the digital image repository an upload of the digital image from the client computer; and
   storing in a memory associated with the digital image repository the digital image;
   transmitting to the digital repository the third request from the first remote computer to send the digital image to the first remote computer for printing the digital image on a first remote printer associated with the first remote computer.

4. The computer readable storage medium of claim 2 wherein the second computer is a second server computer, and wherein the method further comprises the steps of:
   transmitting to the second server computer an upload of the digital image from a first client computer;
   transmitting to the second server computer identification data associated with the digital image;
   storing in a memory associated with the second server computer the digital image;
   storing in the memory the identification data associated with the digital image; and,
   transmitting to the second computer a fourth request to send the digital image to the first remote computer.

5. The computer readable storage medium of claim 2 further comprising the steps of:
   determining that the first remote printer is ready to process the second digital image print request to have the digital image printed; and
   printing the actual digital image received from the digital image repository.

6. The computer readable storage medium of claim 5 wherein the digital image repository is associated with the second computer.

7. The computer readable storage medium of claim 5 wherein the digital image repository is associated with the central computer.

8. The computer readable storage medium of claim 1 wherein the second computer is a retail website server for providing functionality for identifying and receiving information on products and services which can be obtained through the first location.

9. The computer readable storage medium of claim 1 wherein the second computer is a second party retail website server.

10. The computer readable storage medium of claim 9 wherein the second party retail website server is any website which facilitates storing and retrieving a plurality of digital photographic images.

11. The computer readable storage medium of claim 9 wherein the second party retail website server is an internet service provider website.

12. The computer readable storage medium of claim 1 wherein the first remote location comprises a first remote printer for printing the digital image, and a first remote memory in communication with the first remote printer for storing the second request to have the digital image printed, wherein the first remote printer comprises a first interface device for receiving the second request to have the digital image printed.

13. The computer readable storage medium of claim 1 wherein the first remote location comprises a first remote printer for printing the digital image, wherein the first remote printer comprises a first network interface for receiving the second request to have the digital image printed, a first processor in communication with the first network interface for processing the second request to have the digital image printed, a first remote memory in communication with the first processor for storing the second request to have the digital image printed, and a printing mechanism in communication with the processor for printing the digital image.

14. The computer readable storage medium of claim 1 further comprising the steps of:
receiving at the central server a change of location request for changing the location to have the digital image printed, comprising receiving a selection of a new remote location identification to have the digital image printed at a new remote location associated with the new remote location identification; and,
sending to the first remote location a digital image print cancel request to cancel the second digital image print request to have the digital image printed; and,
sending to the new remote location a new digital image print request to have the digital image printed, without sending the digital image to be printed to the new remote location.

15. The computer readable storage medium of claim 14 wherein the new remote location comprises a new remote computer for receiving the new digital image print request to have the digital image printed, a new remote memory for storing the new digital image print request to have the digital image printed, and a new remote printer in communication with the new computer for printing the digital image.

16. The computer readable storage medium of claim 15 further comprising the steps of:
determining that the new remote printer is ready to process the new digital image print request to have the digital image printed;
transmitting a fourth request to the digital image repository storing the digital image for obtaining the actual digital image to be printed;
receiving the actual digital image to be printed from the digital image repository in response to the fourth request; and,
printing the actual digital image received from the digital image repository.

17. The computer readable storage medium of claim 1 further comprising the steps of:
receiving at the first server an availability message from the plurality of the remote locations, wherein the availability message comprises store identifier and an earliest time the digital image print request can be completed for the associated store identifier.

18. The computer readable storage medium of claim 17, wherein availability message is dependent upon at least one of a number of print requests presently pending and the content of each print request.

19. The computer readable storage medium of claim 18, wherein the content of each print request comprises a total size of images to be printed, type of output for each image, and the number of prints for each image type, and a store identifier.

* * * * *